(12) United States Patent
Ohishi

(10) Patent No.: US 10,295,805 B2
(45) Date of Patent: May 21, 2019

(54) ZOOMING OPTICAL SYSTEM

(71) Applicant: Takahiko Ohishi, Tokyo (JP)

(72) Inventor: Takahiko Ohishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/825,178

(22) Filed: Nov. 29, 2017

(65) Prior Publication Data

US 2018/0164556 A1 Jun. 14, 2018

(30) Foreign Application Priority Data

Dec. 9, 2016 (JP) ................................ 2016-239192

(51) Int. Cl.

| | |
|---|---|
| *G02B 13/18* | (2006.01) |
| *G02B 15/167* | (2006.01) |
| *G02B 15/177* | (2006.01) |
| *G02B 15/20* | (2006.01) |
| *G02B 27/64* | (2006.01) |
| *G02B 13/00* | (2006.01) |

(52) U.S. Cl.
CPC .......... *G02B 15/167* (2013.01); *G02B 13/18* (2013.01); *G02B 15/177* (2013.01); *G02B 15/20* (2013.01); *G02B 13/009* (2013.01); *G02B 27/646* (2013.01)

(58) Field of Classification Search
CPC .... G02B 15/167; G02B 13/18; G02B 15/177; G02B 15/20
USPC ......................................................... 359/683
See application file for complete search history.

(56) References Cited

U.S. PATENT DOCUMENTS

| | | | |
|---|---|---|---|
| 5,132,848 A | 7/1992 | Nishio et al. | |
| 2008/0088943 A1* | 4/2008 | Shirota | G02B 15/177 359/686 |
| 2009/0091840 A1* | 4/2009 | Ikeda | G02B 15/17 359/682 |
| 2009/0091842 A1* | 4/2009 | Ikeda | G02B 15/17 359/684 |
| 2009/0231708 A1* | 9/2009 | Shibata | G02B 15/177 359/557 |
| 2010/0053766 A1 | 3/2010 | Okada | |
| 2014/0022442 A1 | 1/2014 | Nishimura | |

(Continued)

FOREIGN PATENT DOCUMENTS

| | | |
|---|---|---|
| JP | 4-163415 | 6/1992 |
| JP | 2010-060612 | 3/2010 |

(Continued)

*Primary Examiner* — James R Greece
(74) *Attorney, Agent, or Firm* — Oblon, McClelland, Maier & Neustadt, L.L.P.

(57) ABSTRACT

A zooming optical system includes a first lens group having negative refractive power, a second lens group having positive refractive power, a third lens group having negative refractive power, and a fourth lens group having positive refractive power, in that order from an object side. The first lens group has at least one cemented lens having positive refractive power. Each of the first lens group, the second lens group, the third lens group, and the fourth lens group are configured to move along a direction of an optical axis in zooming. Conditional expression (1) below is satisfied:

$$-10.0 < f2/f1 < -2.0 \qquad (1),$$

where
f1 is a focal length of the first lens group, and
f2 is a focal length of the second lens group.

10 Claims, 25 Drawing Sheets

(56) References Cited

U.S. PATENT DOCUMENTS

| | | | |
|---|---|---|---|
| 2014/0198394 A1* | 7/2014 | Komatsu | G02B 13/18 359/686 |
| 2015/0042846 A1 | 2/2015 | Shimomura | |
| 2015/0054989 A1* | 2/2015 | Masui | G02B 9/34 348/240.3 |
| 2015/0277091 A1 | 10/2015 | Sugita | |

FOREIGN PATENT DOCUMENTS

| | | |
|---|---|---|
| JP | 2014-021258 | 2/2014 |
| JP | 2014-089365 | 5/2014 |
| JP | 2015-034858 | 2/2015 |
| JP | 2015-197593 | 11/2015 |

* cited by examiner

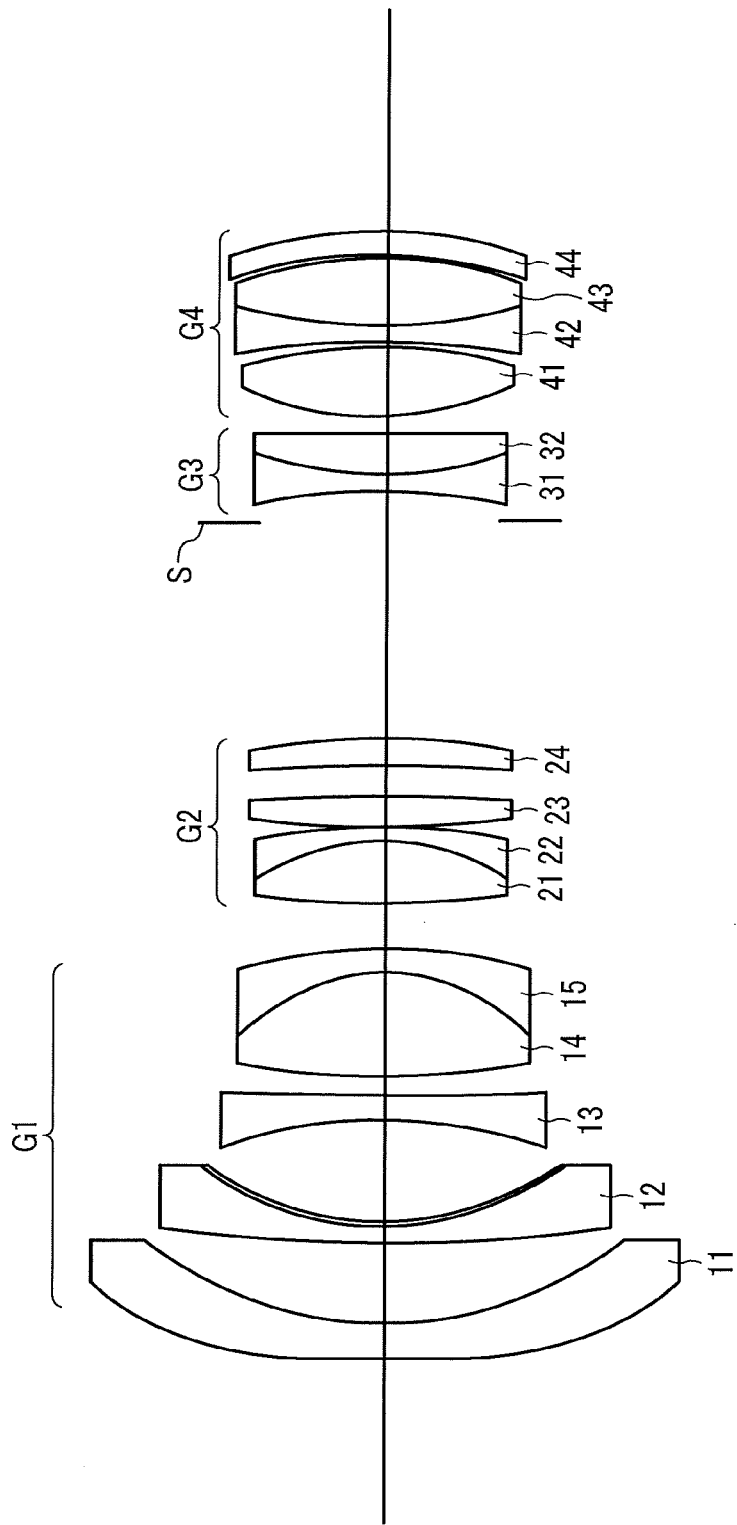

FNO.=1:2.8

— d LINE
--- g LINE
-- - c LINE

-0.2  0.2
SPHERICAL
ABERRATION

CHROMATIC
ABERRATION

Y=14.24

-0.05  0.05
LATERAL
CHROMATIC
ABERRATION

Y=14.24

— S
-- M

-0.1  0.1
ASTIGMATISM

Y=14.24

-5.0  5.0  %
DISTORTION

FNO.=1:2.8

— d LINE
--- g LINE
-- - c LINE

-0.2  0.2
SPHERICAL
ABERRATION

CHROMATIC
ABERRATION

Y=14.24

-0.05  0.05
LATERAL
CHROMATIC
ABERRATION

Y=14.24

— S
-- M

-0.1  0.1
ASTIGMATISM

Y=14.24

-5.0  5.0  %
DISTORTION

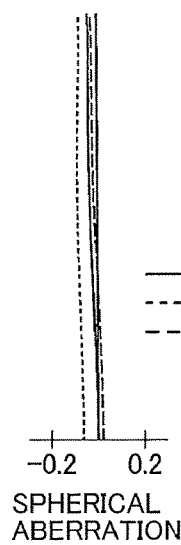
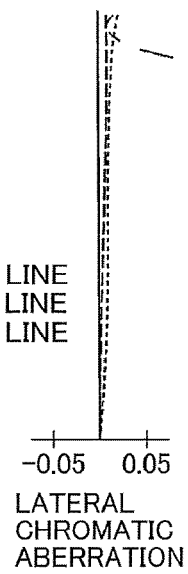
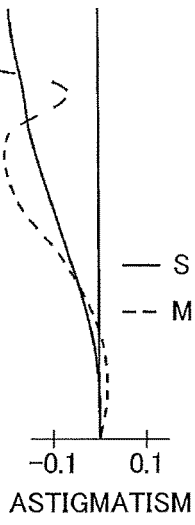
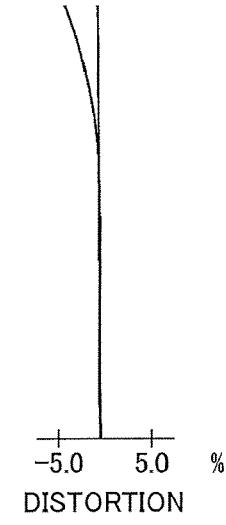
FIG. 7A  FNO.=1:2.9  SPHERICAL ABERRATION CHROMATIC ABERRATION  −0.2  0.2
— d LINE
----- g LINE
---- c LINE
FIG. 7B  Y=14.24  LATERAL CHROMATIC ABERRATION  −0.05  0.05
FIG. 7C  Y=14.24  ASTIGMATISM  −0.1  0.1
— S
-- M
FIG. 7D  Y=14.24  DISTORTION  −5.0  5.0 %
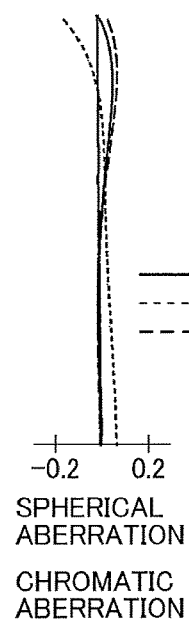
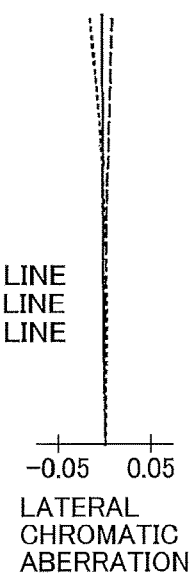
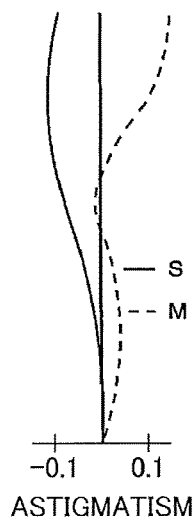
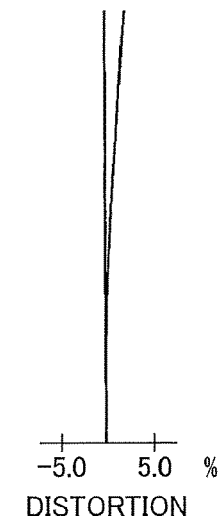
FIG. 8A  FNO.=1:2.9  SPHERICAL ABERRATION CHROMATIC ABERRATION  −0.2  0.2
— d LINE
----- g LINE
---- c LINE
FIG. 8B  Y=14.24  LATERAL CHROMATIC ABERRATION  −0.05  0.05
FIG. 8C  Y=14.24  ASTIGMATISM  −0.1  0.1
— S
-- M
FIG. 8D  Y=14.24  DISTORTION  −5.0  5.0 %

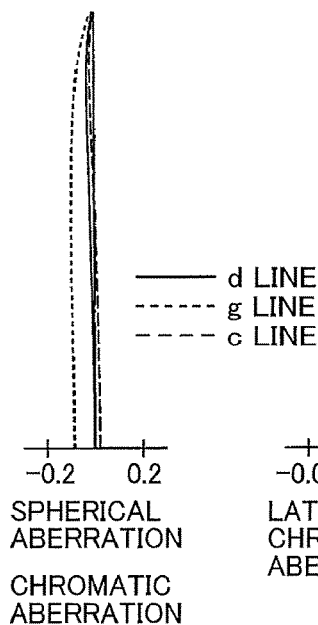
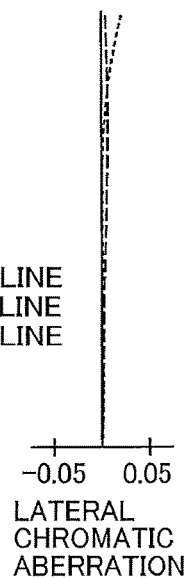
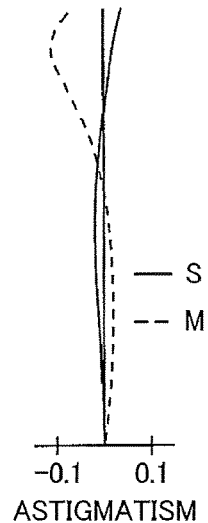
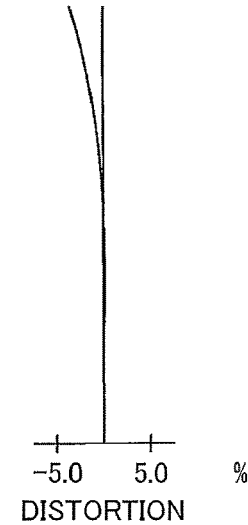
FIG. 11A  FIG. 11B  FIG. 11C  FIG. 11D
FNO.=1:2.8    Y=14.24    Y=14.24    Y=14.24
— d LINE
---- g LINE
---- c LINE
— S
-- M
-0.2  0.2    -0.05  0.05    -0.1  0.1    -5.0  5.0  %
SPHERICAL ABERRATION
CHROMATIC ABERRATION
LATERAL CHROMATIC ABERRATION
ASTIGMATISM
DISTORTION
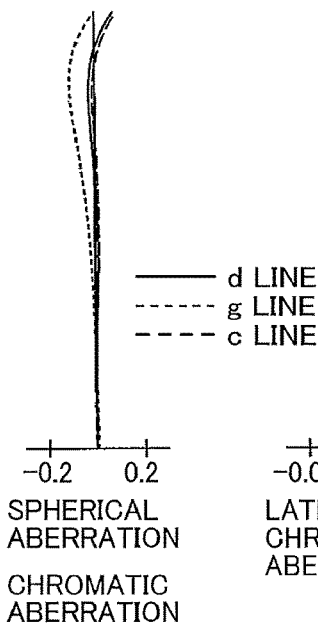
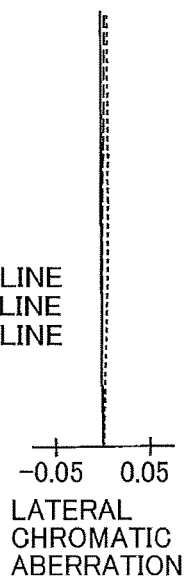
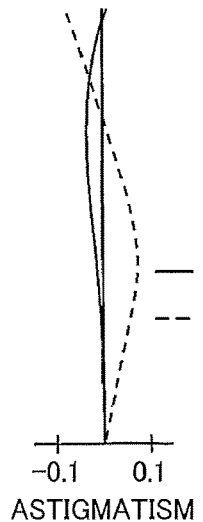
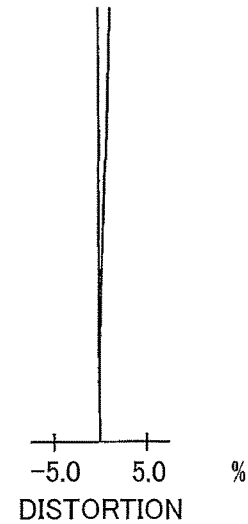
FIG. 12A  FIG. 12B  FIG. 12C  FIG. 12D
FNO.=1:2.8    Y=14.24    Y=14.24    Y=14.24
— d LINE
---- g LINE
---- c LINE
— S
-- M
-0.2  0.2    -0.05  0.05    -0.1  0.1    -5.0  5.0  %
SPHERICAL ABERRATION
CHROMATIC ABERRATION
LATERAL CHROMATIC ABERRATION
ASTIGMATISM
DISTORTION

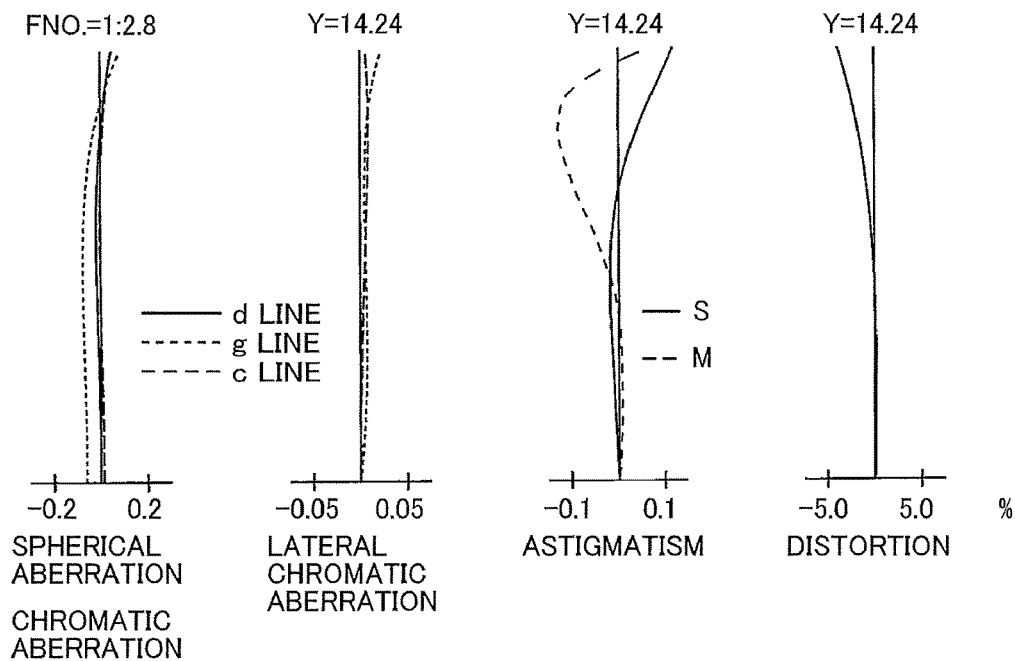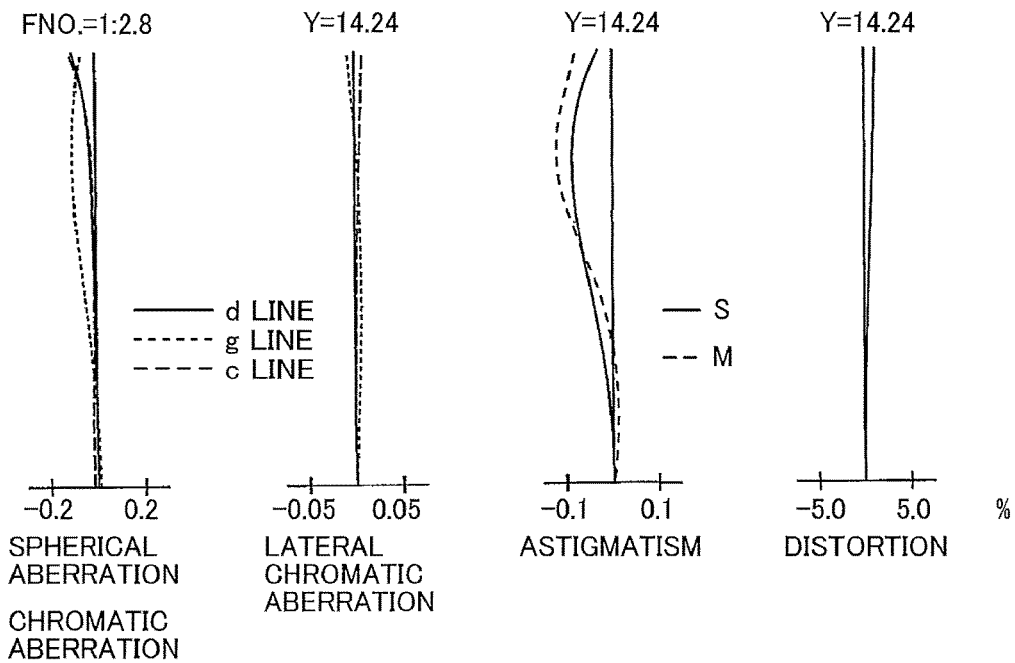

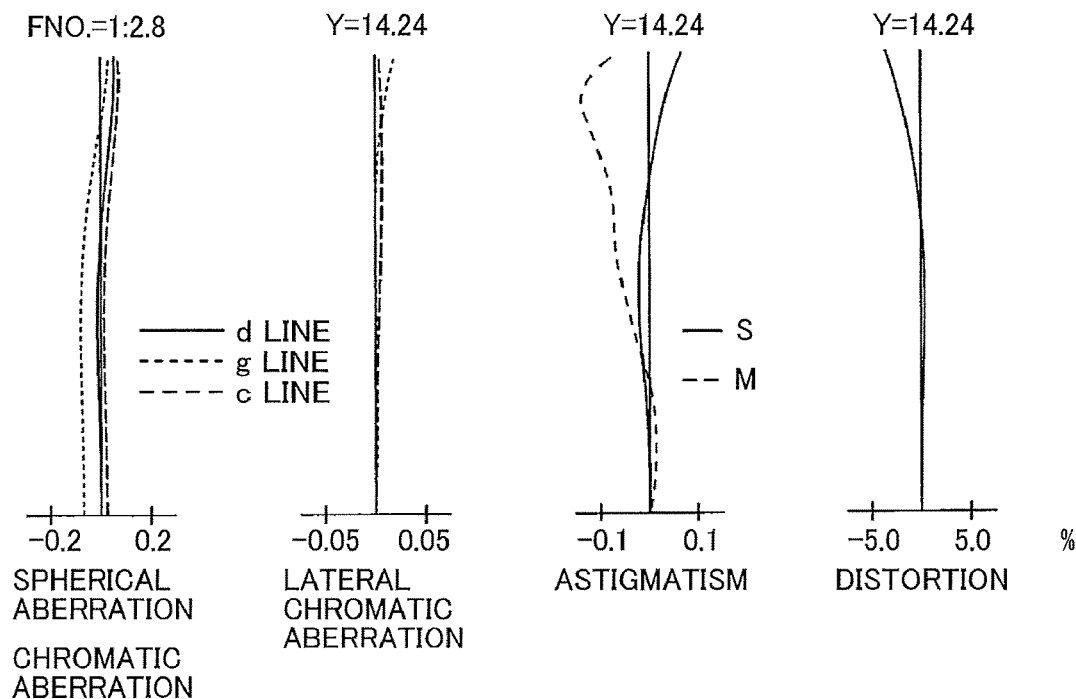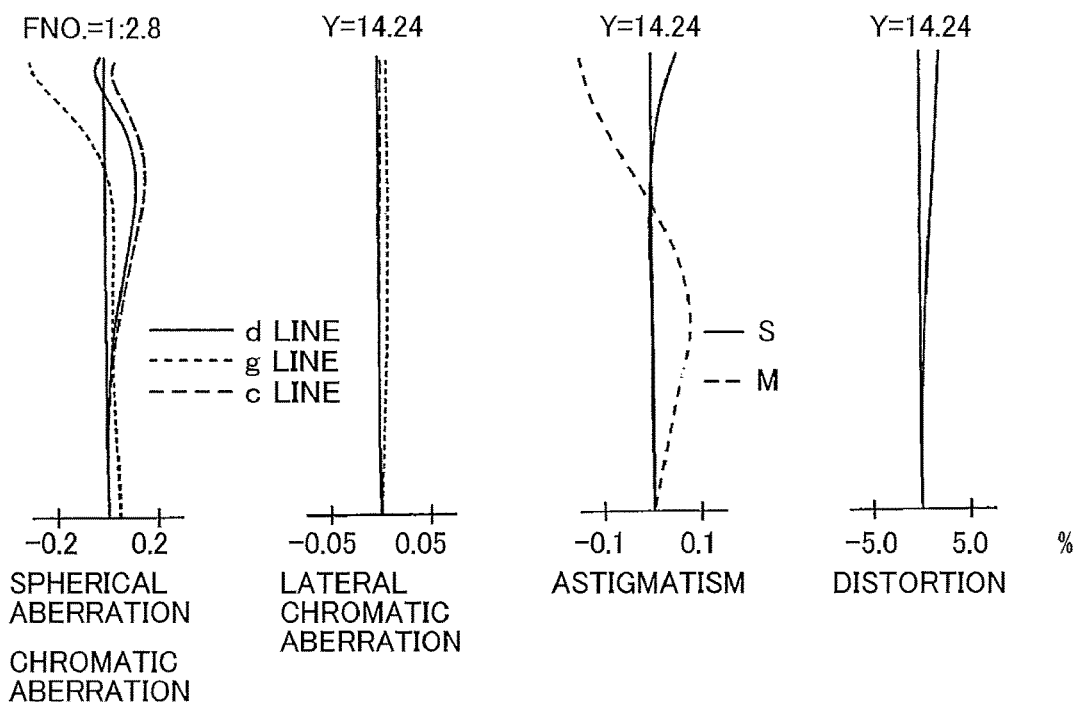

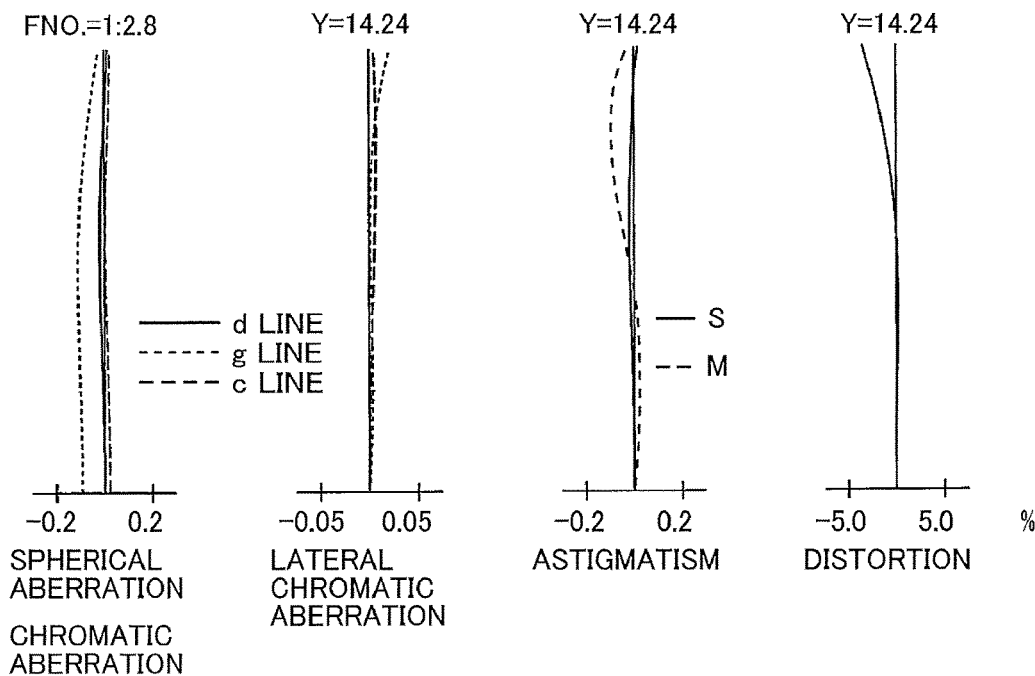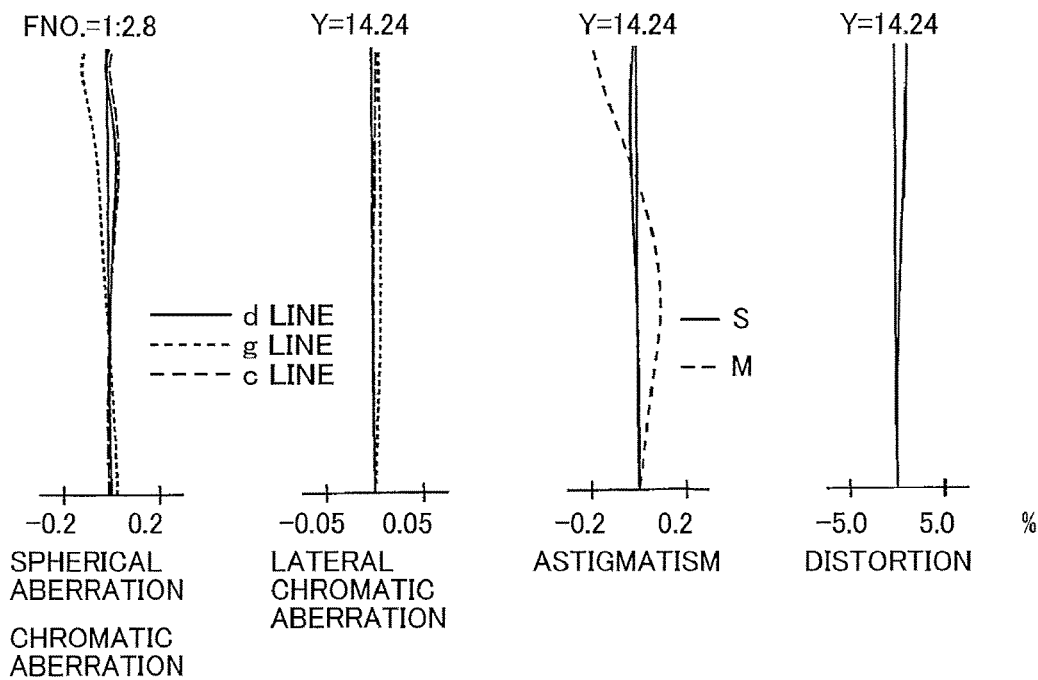

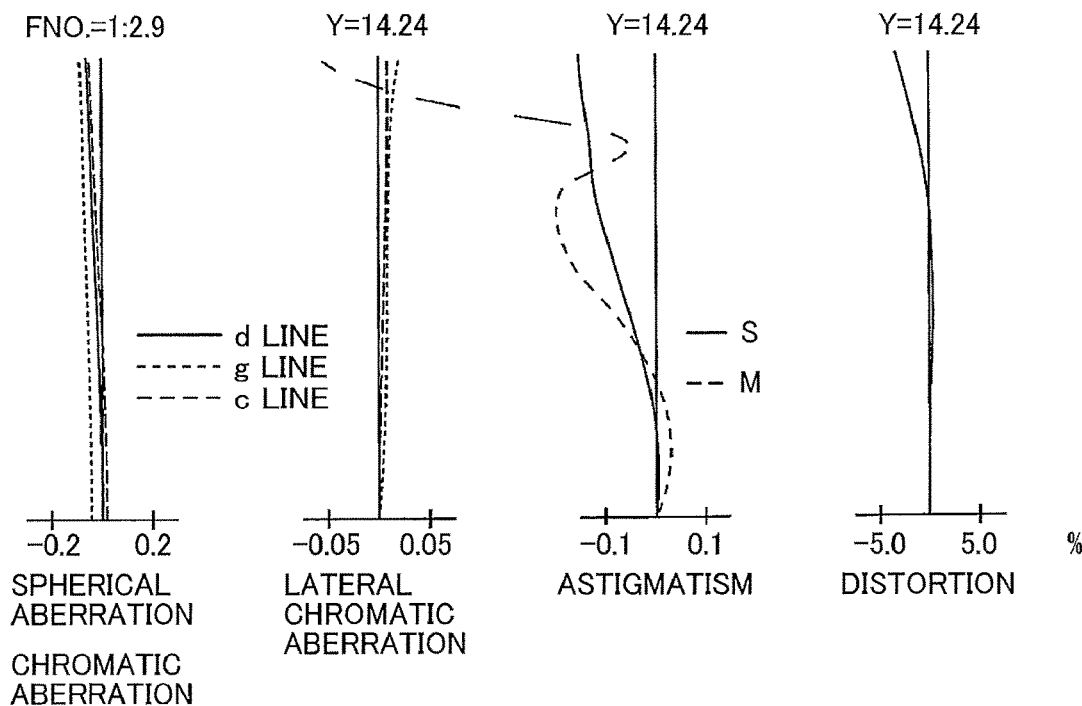
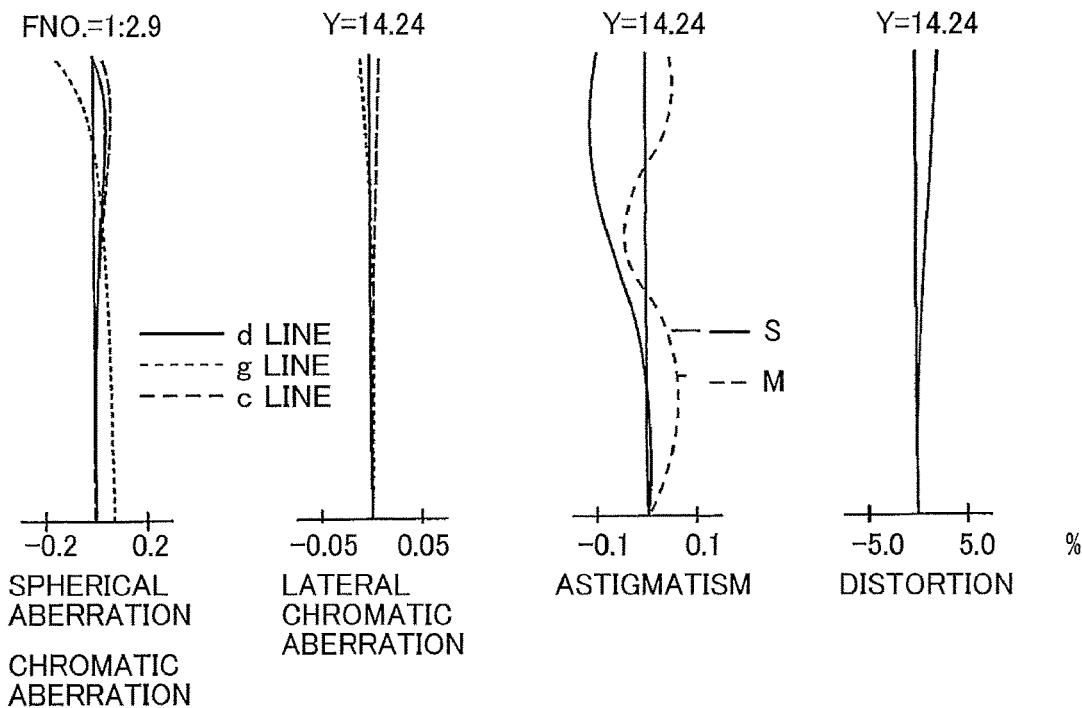

ZOOMING OPTICAL SYSTEM

CROSS-REFERENCE TO RELATED APPLICATION

This patent application is based on and claims priority pursuant to 35 U.S.C. § 119(a) to Japanese Patent Application No. 2016-239192, filed on Dec. 9, 2016 in the Japan Patent Office, the entire disclosure of which is hereby incorporated by reference herein.

BACKGROUND

Technical Field

Embodiments of the present disclosure relate to a zooming optical system.

Background Art

In a typical interchangeable zooming optical system (for example, a super-wide-angle zoom lens system) used for, e.g., a single lens reflex camera or a single lens reflex digital camera, there is a demand for a reduction in focal length while maintaining a sufficiently long back focus between a lens mount surface and an imaging plane to obtain a space in which an instant return mirror rotates.

To respond to such a demand, lenses are known in which a lens group having a strong diverging power is disposed in front, i.e., on the object side. Considering that an interchangeable lens is used in both a single lens reflex camera having an imaging surface (image sensor) of Leica size (36 millimeter (mm)×24 mm) and a single lens reflex camera having an imaging surface (image sensor) of Advanced Photo System type C (APS-C) size (23.6 mm×15.8 mm) that is smaller than the Leica, there is a need to allow even an interchangeable lens for the APS-C-size image sensor to achieve a short focal length to capture an image in a wide angle of view while obtaining a long back focus equivalent to that of the single lens reflex camera for the Leica size. To satisfy such a need, the diverging power of a lens group in front is further increased. Such a configuration, however, has difficult in super widening the angle of view (reducing the focal length) while correcting aberration.

SUMMARY

In one aspect of this disclosure, there is provided an improved zooming optical system including a first lens group having negative refractive power, a second lens group having positive refractive power, a third lens group having negative refractive power, and a fourth lens group having positive refractive power, in that order from an object side. The first lens group has at least one cemented lens having positive refractive power. Each of the first lens group, the second lens group, the third lens group, and the fourth lens group are configured to moves along a direction of an optical axis in zooming. Conditional expression (1) below is satisfied:

$$-10.0 < f2/f1 < -2.0 \quad (1),$$

where
f1 is a focal length of the first lens group, and
f2 is a focal length of the second lens group.

In another aspect of this disclosure there is provided an improved zooming optical system including a first lens group having negative refractive power; a second lens group having positive refractive power; a third lens group having negative refractive power; and a fourth lens group having positive refractive power, in that order from the object side. The first lens group has a negative lens positioned disposed closest to an object side. The fourth lens group includes at least four lenses that includes at least one cemented lens, in that order from the object side. Each of the first lens group, the second lens group, the third lens group, and the fourth lens group moving configured to move along a direction of an optical axis in zooming. Conditional expressions (1a), (2a), and (3a) are satisfied:

$$-2.5 < f2/f1 < -2.0 \quad (1a),$$

$$2.0 < f3/f1 < 4.0 \quad (2a), \text{ and}$$

$$-1.0 < f4/f3 < -0.5 \quad (3a)$$

where
f1 is a focal length of the first lens group,
f2 is a focal length of the second lens group,
f3 is a focal length of the third lens group, and
f4 is a focal length of the fourth lens group.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 2 is an illustration of a configuration of the zooming optical system of FIG. 1 focused on infinity at a long focal length end according to an embodiment of the present disclosure;

FIGS. 7A through 7D are aberration diagrams of the configuration of FIG. 5;

FIGS. 8A through 8D are lateral aberration diagrams of the configuration of FIG. 6;

FIGS. 11A through 11D are aberration diagrams of the configuration of FIG. 9;

FIGS. 12A through 12D are lateral aberration diagrams of the configuration of FIG. 10;

FIGS. 15A through 15D are aberration diagrams of the configuration of FIG. 13;

FIGS. 16A through 16D are lateral aberration diagrams of the configuration of FIG. 14;

FIGS. 19A through 19D are aberration diagrams of the configuration of FIG. 17;

FIGS. 20A through 20D are lateral aberration diagrams of the configuration of FIG. 18;

FIGS. 23A through 23D are aberration diagrams of the configuration of FIG. 21;

FIGS. 24A through 24D are lateral aberration diagrams of the configuration of FIG. 22;

FIGS. 27A through 27D are aberration diagrams of the configuration of FIG. 25;

FIGS. 28A through 28D are lateral aberration diagrams of the configuration of FIG. 26;

Figure 1:
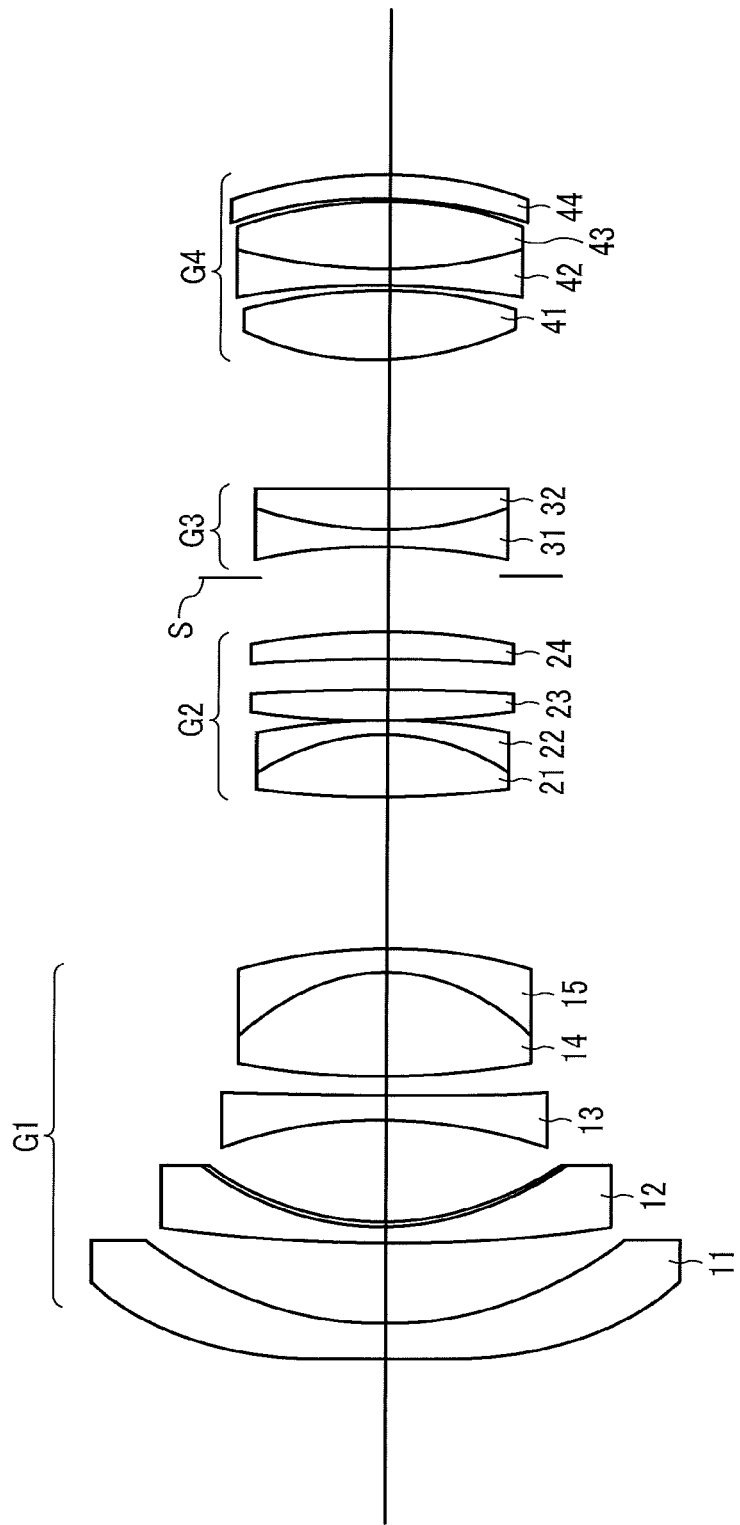
FIG. 1 is an illustration of a configuration of a zooming optical system focused on infinity at a short focal length end according to an embodiment of the present disclosure.
Figure 3A:
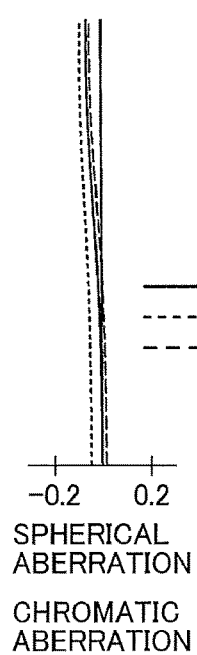
FIGS. 3A through 3D are aberration diagrams of the configuration of FIG. 1.
Figure 3B:
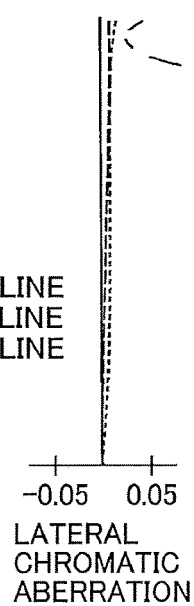
Figure 3C:
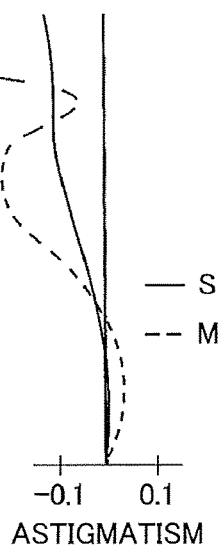
Figure 3D:
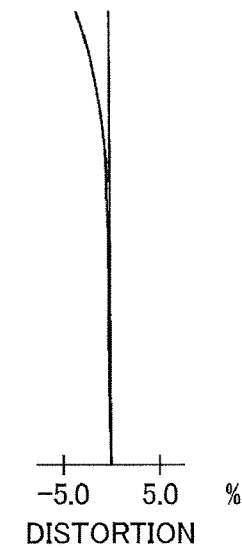
Figure 4A:
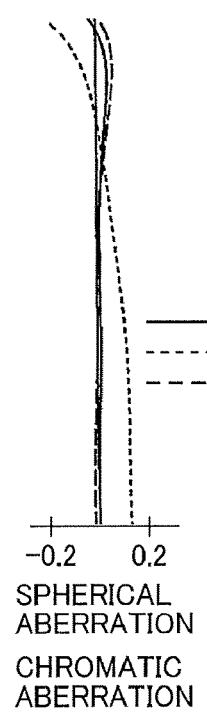
FIGS. 4A through 4D are lateral aberration diagrams of the configuration of FIG. 2.
Figure 4B:
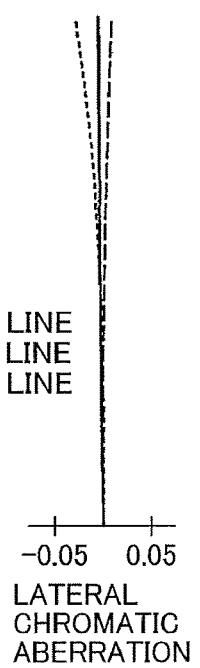
Figure 4C:
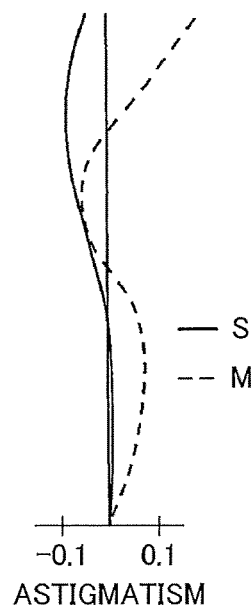
Figure 4D:
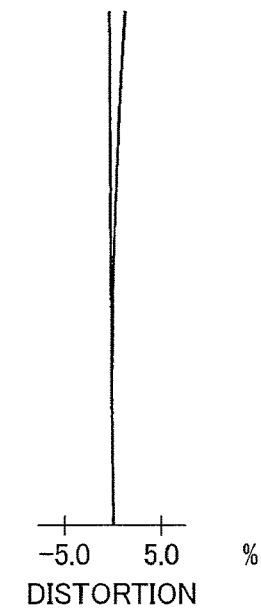

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

First, the term "cemented lens" is defined in the present disclosure as follows. The term "cemented lens" used in the present specification refers to both a typical cemented lens and a so-called hybrid lens. The typical cemented lens is a cemented lens in which a plurality of lenses, each being relatively thick at least one of the center portion (in the vicinity of the optical axis) and the outer edge portion, is bonded to each other with adhesive having a substantially no thickness. The hybrid lens is a lens having an aspherical effect and a diffraction effect imparted by applying a thin resin layer to the entire surface of the lens that is relatively thick at one of the center portion and the outer edge portion.

A zooming optical system Z according to an embodiment of the present disclosure consists of a first lens group G1 having negative refractive power, a second lens group G2 having positive refractive power, a third lens group G3 having negative refractive power, and a fourth lens group G4 having positive refractive power in all of numerical examples 1 through 7 as illustrated in FIGS. 29 through 35. In FIGS. 29 through 35, the symbol "I" denotes a designed image plane.

In zooming from a short focal length end (Wide) to a long focal length end (Tele) in numerical examples 1, 2, and 4 through 7, the first lens group G first moves to an image side to go over the position of the short focal length end and moves back to the object side, thus moving to the object side.

In zooming from the short focal length end (Wide) to the long focal length end (Tele) in numerical example 3, the first lens group G first moves to an image side and slightly further moves to the image side, thus moving to the image side.

The second lens group G2 monotonically moves to the object side in zooming from the short focal length end (Wide) to the long focal length end (Tele) in all of numerical examples 1 through 7.

In zooming from the short focal length end (Wide) to the long focal length end (Tele) in numerical example 3, the first lens group G first moves to an image side and slightly further moves to the image side, thus moving to the image side.

In zooming from a short focal length end (Wide) to a long focal length end (Tele) in numerical example 2, the third group G3 first moves to the image side to go over the position of the short focal length end, and then moves back to the object side, thus moving to the object side.

In the numerical embodiments 3 through 6, the third lens group G3 monotonically moves to the object side in zooming from the short focal length end (Wide) to the long focal length end (Tele).

In the numerical embodiment 7, the third lens group G3 monotonically moves to the image side in zooming from the short focal length end (Wide) to the long focal length end (Tele).

The fourth lens group G4 monotonically moves to the object side in zooming from the short focal length end (Wide) to the long focal length end (Tele) in all of numerical examples 1 through 7.

Note that each lens group has a degree of freedom for behavior in zooming, and various changes in design are possible as far as the distance between adjacent lens groups changes in zooming.

The first lens group G1 according to the numerical examples 1, 2, and 7 includes a negative lens 11, a negative lens 12, a negative lens 13, a positive lens 14, and a negative lens 15 in that order from the object side. The negative lens 11 has an aspherical surface facing the object side. The negative lens 12 is a hybrid lens (a cemented lens having negative refractive power) formed by bonding an aspherical surface layer made of synthetic resin material to the image-side surface of a glass lens. The positive lens 14 and the negative lens 15 are cemented to each other to form a cemented lens having positive refractive power.

The first lens group G1 according to the numerical examples 3 through 6 includes a negative lens 11a, a negative lens 12a, a negative lens 13a, a negative lens 14a, a positive lens 14a, a positive lens 15a, a positive lens 16a, and a negative lens 17a in that order from the object side. The negative lens 12a has an aspherical surface facing the image side. The negative lens 14a and the positive lens 15a are cemented to each other to form a cemented lens having negative refractive power. The positive lens 16a and the negative lens 17a are cemented to each other to form a cemented lens having positive refractive power.

The second lens group G2 according to the numerical examples 1, 2, and 7 includes a positive lens 21, a negative lens 22, a positive lens 23, and a positive lens 24, in that order from the object side. The positive lens 21 and the negative lens 22 are cemented to each other. The second lens group G2 according to the numerical examples 1, 2, and 7 includes a front group (the positive lens 21, the negative lens 22, and the positive lens 23) on the object side and a rear group (the positive lens 24) on the image side. Between the front group and the rear group, there is a largest air space. In some embodiments, the front group on the object side in the second lens group G2 according to the numerical examples 1, 2, and 7 is a focusing lens group that moves in a change in focus.

The second lens group G2 according to the numerical examples 3 through 6 includes a negative lens 21a, a positive lens 22a, and a positive lens 23a in that order from the object side. The negative lens 21a and the positive lens 22a are cemented to each other. The second lens group G2 according to the numerical examples 3 through 6 includes a front group (the negative lens 21a and the positive lens 22a) on the object side and a rear group (the positive lens 23a) on the image side. Between the front group and the rear group, there is a largest air space. In some embodiments, the front group on the object side in the second lens group G2 according to the numerical examples 3 through 6 is a focusing lens group that moves in a change in focus.

The third lens group G3 according to all of the numerical examples 1 through 7 includes a negative lens 31 and a positive lens 32 in that order from the object side, these two lenses forming a cemented lens.

The fourth lens group G4 according to all of the numerical examples 1 through 7 includes a positive lens 41, a negative lens 42, a positive lens 43, and a positive lens 44 in that order from the object side. The negative lens 42 and the positive lens 43 are cemented to each other.

The positive lens 41 of the fourth lens group according to the numerical examples 3 through 6 has an aspherical surface facing the image side.

The negative lens 42 of the fourth lens group according to the numerical examples 3, 5, and 6 is a hybrid lens formed by bonding an aspherical surface layer made of synthetic resin material to the object-side surface of a glass lens.

The positive lens 44 according to the numerical examples 1, 2, and 7 has an aspherical surface at each side.

The positive lens 44 according to the numerical example 4 is a hybrid lens formed by bonding an aspherical surface layer made of synthetic resin material to the object-side surface of a glass lens.

The zooming optical system Z according to the present embodiments employs, for example, a negative lead lens system of a four-group configuration, in which negative, positive, negative, and positive power are arranged in that order. The zooming optical system Z according to the present embodiments provides a long back focus and achieves higher optical performance with both an imaging angle of view of less than 100 degrees and an imaging angle of 100 degrees or more at the short focal length end.

More specifically, the zooming optical system Z according to the present embodiments includes a negative lens on the object side within the first lens group G1 (in the numerical examples 1, 2, and 7, three negative lenses 11 through 13, and in the numerical examples 3 through 6, four negative lenses 11a through 14a). With such a configuration in which negative power is imparted to the lenses on the object side within the first lens group G1, a wide angle of view (short focal length) and a long back focus are successfully obtained.

In the zooming optical system Z according to the present embodiments, aberration that occurs in the negative lenses on the object side within the first lens group G1 is corrected by a cemented lens (a cemented lens formed by the positive lens 14 and the negative lens 15, or a cemented lens formed by the positive lens 16a and the negative lens 17a) having positive refractive power in the first lens group G1. Disposing the cemented lens having positive refractive power in the first lens group G1 allows higher resolution capability.

Further, in the zooming optical system Z according to the present embodiments, the power between the lens groups G1, G2, G3, and G4 is well balanced (for example, the power balance between the first lens group G1 and the second lens group G2, the power balance between the second lens group G2 and the third lens group G3, and the power balance between the third lens group G3 and the fourth lens group G4). Such a configuration successfully corrects various aberrations, thereby achieving higher optical performance. For example, the zooming optical system Z according to the present embodiments has a strong diverging power in the first lens group G1 to adapt to the APS-C image sensor having a wide full angle of view up to 100 degrees or more. However, with an excessive increase in diverging power of the first lens group G1, the following lens groups fail to correct the aberration generated in the first lens group G1. Imparting an appropriate level of diverging power to the first lens group G1 exhibits advantageous effects for correction of aberrations.

Conditional expressions (1), (1a), and (1aa) define the ratio of the focal length of the first lens group G1 to the focal length of the second lens group G2:

$$-10.0 < f2/f1 < -2.0 \qquad (1),$$

$$-3.0 < f2/f1 < -2.0 \qquad (1aa); \text{ and}$$

$$-2.5 < f2/f1 < -2.0 \qquad (1a),$$

where f1 is the focal length of the first lens group G1, and
f2 is a focal length of the second lens group G2.

Satisfying conditional expression (1) achieves both a sufficiently wide angle of view and a sufficiently long back focus, and successfully corrects aberrations (for example, coma aberration). Such advantageous effects are enhanced preferably by satisfying conditional expressions (1aa), and more preferably by satisfying conditional expressions (1a).

When the value of f2/f1 exceeds the upper limit defined by conditional expressions (1), (1a), and (1aa), the power of the first lens group G1 excessively decreases, thereby resulting in achieving both a sufficient wide angle of view and a sufficient long back focus.

When the value of f2/f1 exceeds the lower limit defined by conditional expression (1), the power of the first lens group G1 excessively increases, resulting in difficulty in correcting aberration (for example, coma aberration) generated in the negative lens on the object side in first lens group G1 even with a cemented lens having positive refractive power disposed in the first lens group G1.

Conditional expression (2) defines the ratio of the focal length of the first lens group G1 to the focal length of the third lens group G3:

$$2.0 < f3/f1 < 5.0 \qquad (2),$$

where f1 is the focal length of the first lens group G1, and
f3 is the focal length of the third lens group G3.

Satisfying conditional expression (2) successfully corrects spherical aberration, distortion, and coma aberration.

When the value of f3/f1 exceeds the upper limit defined by conditional expression (2), a great amount of spherical aberration and coma aberration are generated particularly in the third lens group G3, resulting in difficulty in correcting these aberrations.

When the value of f3/f1 exceeds the lower limit defined by conditional expression (2), a great amount of distortion and coma aberration are generated particularly in the first lens group G1, resulting in difficulty in correcting these aberrations.

Conditional expressions (3) and (3a) define the ratio of the focal length of the third lens group G3 to the focal length of the fourth lens group G4 (the power balance between the third lens group G3 and the fourth lens group G4):

$$-1.0 < f4/f3 < 0 \qquad (3), \text{ and}$$

$$-1.0 < f4/f3 < -0.5 \qquad (3a),$$

where f3 is the focal length of the third lens group G3, and
f4 is the focal length of the fourth lens group G4.

Satisfying conditional expression (3) prevents the occurrence of aberration due to the movement of the third lens group G3 and the fourth lens group G4 (the change in distance between lens groups), and particularly prevents the fluctuations in spherical aberration and coma aberration that fluctuate with a change in magnification. Such advantageous effects are enhanced by satisfying conditional expression (3a).

When the value of f4/f3 exceeds the upper limit defined by conditional expression (3), an assumed power arrangement (the third lens group G3 having negative refractive power and the fourth lens group having positive refractive power) is not obtained.

When the value of f3/f1 exceeds the lower limit defined by conditional expression (3) or (3a), the power of fourth lens group G4 excessively decreases as compared to the power of the third lens group G3, which causes an excessive correction in the focal range of the third lens group G3 or the fourth lens group G4 when zooming. Thus, spherical aberration and coma aberration are not successfully corrected.

In the zooming optical system Z according to the present embodiments, the first lens group G1 includes at least one cemented lens having positive refractive power (a cemented lens of the positive lens 14 and the negative lens 15 or a cemented lens of the positive lens 16a and the negative lens 17a) and at least one cemented lens having negative refractive power (the hybrid lens 12 having an aspherical surface and negative refractive power or a cemented lens of the negative lens 14a and the positive lens 15a). The number of cemented lenses having negative or positive refractive power to be disposed in the first lens group G1 is optional, and various design changes are possible. In the present embodiments, one or more cemented lenses having positive refractive power and one or more cemented lenses having negative refractive power are disposed in the first lens group G1. This configuration successfully corrects chromatic aberration and coma aberration.

Conditional expressions (4) and (4a) define the ratio of the radius of curvature of a bonded surface of a cemented lens having positive refractive power in the first lens group G1 to the focal length of the cemented lens:

$$RcP/fcP < 0 \qquad (4), \text{ and}$$

$$-0.5 < RcP/fcP < 0 \qquad (4a),$$

where

RcP is the radius of curvature of a bonded surface of at least one cemented lens having positive refractive power in the first lens group G1, and
fcP is the focal length of at least one cemented lens having positive refractive power in the first lens group G1.

Satisfying conditional expression (4) successfully corrects chromatic aberration and coma aberration, thereby achieving higher resolution capability.

When the value of RcP/fcP exceeds the upper limit defined by conditional expression (4) or (4a), particularly chromatic aberration is excessively corrected, which causes a poor power balance over the entire range of the zooming optical system Z, increasing aberration, resulting in a reduction of resolution capability.

Particularly when the value of RcP/fcP exceeds the lower limit defined by conditional expression (4) or (4a), chromatic aberration and coma aberration are successfully corrected.

Conditional expressions (5) and (5a) define the ratio of the focal length of the cemented lens having positive refractive power to the focal length of the cemented lens having negative refractive power in the first lens group G1:

$$-0.6 < fcN/fcP \qquad (5), \text{ and}$$

$$-0.6 < fcN/fcP < -0.2 \qquad (5a),$$

Where fcP is the focal length of at least one cemented lens having positive refractive power in the first lens group G1; and
fcN is the focal length of at least one cemented lens having negative refractive power in the first lens group G1.

The negative refractive power and the positive refractive power of the cemented lenses differ from each other in a target aberration to be corrected. Accordingly, when any one of the positive refractive power and the negative refractive power of the cemented lenses is excessively strong, the residual aberration having not been completely corrected is not successfully reduced in the first lens group G1. To handle such a circumstance, conditional expressions (5) and (5a) are used to obtain (set) a well balance between the positive refractive power of the cemented lens and the negative refractive power of the negative refractive power of the cemented lens. Satisfying conditional expression (5) successfully corrects coma aberration and distortion, thereby successfully correcting chromatic aberration, thus to achieve higher resolution capability. Such an advantageous effect is enhanced by satisfying conditional expression (5a).

When the value of fcN/fcP exceeds the upper limit defined by conditional expression (5) (for example, the value of fcN/fcP is greater than 0), an assume power arrangement (the cemented lens having positive refractive power and the cemented lens having negative refractive power) is not obtained.

When the value of fcN/fcP exceeds the lower limit defined by conditional expression (5), the negative refractive power of the cemented lens in the first lens group G1 excessively decreases, and/or the positive refractive power of the cemented lens in the first lens group G1 excessively increases. This scenario leads to difficulty in correcting coma aberration and distortion and causes an insufficient correction of chromatic aberration, resulting in a reduction in resolution capability.

In the zooming optical system Z according to at least one embodiment, the first lens group G1 includes a negative lens (the negative lens 11 or the negative lens 11a) positioned closest to the object side, and the fourth lens group G4 includes at least four lenses (the positive lens 41, the negative lens 42, the positive lens 43, and the positive lens 44) that include at least one cemented lens (a cemented lens of the negative lens 42 and the positive lens 43). The zooming optical system Z according to at least one embodiment satisfies the above-described conditional expressions (1a), (2a), and (3a);

$$-2.5 < f2/f1 < -2.0 \quad (1a);$$

$$2.0 < f3/f1 < 4.0 \quad (2a); \text{ and}$$

$$-1.0 < f4/f3 < -0.5 \quad (3a),$$

where
f1 is the focal length of the first lens group G1,
f2 is the focal length of the second lens group G2,
f3 is the focal length of the third lens group G3, and
f4 is the focal length of the fourth lens group G4.

With such a configuration in which negative power is imparted to the lens (the negative lens) on the object side within the first lens group G1, a wide angle of view (short focal length) and a long back focus are successfully obtained. Optimizing the negative power of the first lens group G1 by using conditional expression (1a) allows the second lens group G2 having the positive refractive power to correct aberration generated in the first lens group G1 having the negative refractive power while maintaining a wide angle of view (short focal length) and a long back focus. The residual aberration, which has not been completely corrected, particularly axial aberration, is successfully corrected by the third lens group G3 having the power balanced with the power of the fourth lens group G4 by conditional expressions (2a) and (3a). Further, the fourth lens group G4 of the zooming optical system Z according to at least one embodiment includes at least four lenses that include at least one cemented lens, which successfully corrects off-axis aberration in particular. Such a configuration allows a successful correction of aberration over the entire lens of the zooming optical system Z according to at least one embodiment of the present disclosure.

EXAMPLES

The following specifically describes numerical examples 1 through 7. In various aberration diagrams and Tables, the d line, g line, and c line represent aberrations with respect to different wavelengths. Further, the symbol "S" denotes aberration in the sagittal direction and the symbol "M" denotes aberration in the meridional direction. The symbol "FNO." denotes an F number, the symbol "f" denotes the focal length of the entire zooming optical system Z, and the symbol "W" denotes a half angle of view. The symbol "Y" denotes an image height, and the symbol "fB" denotes back focus. The symbol "L" denotes the total length of the zooming optical system Z, and the symbol "R" denotes a radius of curvature. The symbol "d" denotes the thickness of a lens or the distance between lenses. The symbol "N(d)" denotes a refractive index with respect to the d line, and the symbol "v(d)" denotes the Abbe's number with respect to the d line. The back focus is a distance from the surface closest to the image side in the entire zooming optical system Z to the designed image plane I in FIGS. 29 through 35. The values for Each of the F number, the focal length, the half angle of view, the image height, the back focus, the total length of the zooming optical system Z, and the distance between lenses that changes in zooming are listed for the short focal length end, the intermediate focal length, and the long focal length end in that order. The unit of length is millimeter (mm).

A rotationally symmetric aspherical surface is defined by the following equation:

$$x = cy2/[1+[1-(1+K)c2y2]^{1/2}] + A4y4 + A6y6 + A8y8 + A10y10 + A12y12 \ldots,$$

where c denotes a curvature (1/r), y denotes the height from the optical axis, and K denotes a cone coefficient.

In this case, A4, A6, A8 . . . denote spherical surface coefficients of each order, and x denotes a sag.

Numerical Example 1

FIGS. 1 through 4D and Tables 1 through 4 represent numerical example 1 of the zooming optical system Z according to an embodiment of the present disclosure. FIG. 1 is a schematic diagram of a lens focused on infinity at the short focal length end. FIGS. 3A through 3D are aberration diagrams of the lens of FIG. 1. FIG. 2 is a schematic diagram of a lens focused on infinity at the long focal length end. FIGS. 4A through 4D are aberration diagrams of the lens of FIG. 2. Tables 1, 2, 3, and 4 represent data regarding surface, various types of data, data regarding aspherical surface, and data regarding lens group, respectively.

The zooming optical system Z according the present numerical example 1 includes a first lens group G1 having negative refractive power; a second lens group G2 having positive refractive power; a third lens group G3 having negative refractive power; and a fourth lens group G4 having positive refractive power in that order from an object side. Between the second lens group G2 and the third lens group G3 (immediately in front of the third lens group G3), an aperture stop S that moves together with the third lens group G3 is disposed.

The first lens G1 includes a negative meniscus lens 11 with a convex surface facing the object side, a negative meniscus lens 12 with a convex surface facing the object side, a biconcave negative lens 13, a biconvex positive lens 14, and a negative meniscus lens 15 with a convex surface facing the image side, in that order from the object side. The negative meniscus lens 11 has an aspherical surface facing the object side. The negative meniscus lens 12 is a hybrid lens (a cemented lens having negative refractive power) formed by bonding an aspherical surface layer made of synthetic resin material to the image-side surface of a glass lens. The biconvex positive lens 14 and the negative meniscus lens 15 are cemented to each other to constitute a cemented lens having positive refractive power.

The second lens group G2 includes a biconvex positive lens 21, a negative meniscus lens 22 with a convex surface facing the image side, a biconvex positive lens 23, and a positive meniscus lens 24 with a convex surface facing the image side, in that order from the object side. The biconvex positive lens 21 and the negative meniscus lens 22 are cemented to each other.

The third lens group G3 includes a biconcave negative lens 31 and a positive meniscus lens 32 with a convex surface facing the object side in that order from the object side, which are cemented to each other to form a cemented lens. That is, the third lens group G3 includes a cemented lens.

The fourth lens group G4 includes a biconvex positive lens 41, a biconcave negative lens 42, a biconvex positive lens 43, and a positive meniscus lens 44 with a convex surface facing the image side. The biconcave negative lens 42 and the biconvex positive lens 43 are cemented to each other. The positive meniscus lens 44 has an aspherical surface at each side.

TABLE 1

Surface Data

| Surface Number | R | d | (d) | ν(d) |
|---|---|---|---|---|
| 1* | 272.344 | 2.800 | 1.69350 | 53.2 |
| 2 | 26.784 | 6.553 | | |
| 3 | 125.855 | 1.746 | 1.78000 | 50.9 |
| 4 | 22.068 | 0.200 | 1.52972 | 42.7 |
| 5* | 24.792 | 8.100 | | |
| 6 | −35.314 | 1.968 | 1.81000 | 37.2 |
| 7 | 248.890 | 1.512 | | |
| 8 | 58.206 | 8.505 | 1.54732 | 46.0 |
| 9 | −13.791 | 1.919 | 1.85000 | 44.0 |
| 10 | −35.848 | d10 | | |
| 11 | 93.549 | 4.713 | 1.56732 | 42.8 |
| 12 | −17.723 | 1.300 | 1.81600 | 46.6 |
| 13 | −45.971 | 0.200 | | |
| 14 | 73.588 | 2.380 | 1.56406 | 46.3 |
| 15 | −181.972 | 2.484 | | |
| 16 | −211.824 | 2.315 | 1.49700 | 81.6 |
| 17 | −46.263 | d17 | | |
| 18 stop | ∞ | 2.508 | | |
| 19 | −40.990 | 1.350 | 1.80400 | 46.6 |
| 20 | 24.622 | 3.390 | 1.84666 | 23.8 |
| 21 | 16468.030 | d21 | | |
| 22 | 22.432 | 5.634 | 1.43875 | 95.0 |
| 23 | −35.188 | 0.467 | | |
| 24 | −64.205 | 1.350 | 1.84666 | 23.8 |
| 25 | 37.567 | 5.468 | 1.49700 | 81.6 |
| 26 | −28.517 | 0.150 | | |
| 27* | −199.129 | 2.000 | 1.51633 | 64.1 |
| 28* | −62.238 | — | | |

*Rotationally Symmetric Aspherical Surface

TABLE 2

Various Data
Zooming Ratio 1.57

| | Short | Intermediate | Long |
|---|---|---|---|
| FNO. | 2.8 | 2.8 | 2.8 |
| f | 11.25 | 14.00 | 17.70 |
| W | 52.6 | 45.3 | 38.4 |
| Y | 14.24 | 14.24 | 14.24 |
| fB | 38.14 | 42.13 | 48.88 |
| L | 134.42 | 135.55 | 139.13 |
| d10 | 12.448 | 7.614 | 3.125 |
| d17 | 4.429 | 11.146 | 16.949 |
| d21 | 10.392 | 5.652 | 1.162 |

Short: Short Focal Length End,
Intermediate: Intermediate Focal length, and
Long: Long Focal Length End

TABLE 3

Aspherical Surface Data

| Surface Number | K | A4 | A6 | A8 | A10 | A12 |
|---|---|---|---|---|---|---|
| 1 | −11.636 | 0.4186E−04 | −0.1186E−06 | 0.3434E−09 | −0.5617E−12 | 0.4229E−15 |
| 5 | 0.055 | 0.7196E−04 | −0.3796E−06 | 0.1912E−08 | −0.8408E−11 | 0.0000E+00 |
| 27 | 0.000 | −0.9870E−04 | −0.3859E−06 | 0.1285E−08 | 0.6790E−11 | 0.2725E−13 |
| 28 | 2.202 | −0.6747E−04 | −0.3336E−06 | 0.2692E−08 | −0.5199E−11 | 0.4675E−13 |

TABLE 4

Lens Group Data

| Group | Starting Surface | Focal Length |
|---|---|---|
| 1 | 1 | −13.88 |
| 2 | 11 | 36.15 |
| 3 | 19 | −55.83 |
| 4 | 22 | 33.03 |

Numerical Example 2

Figure 5:
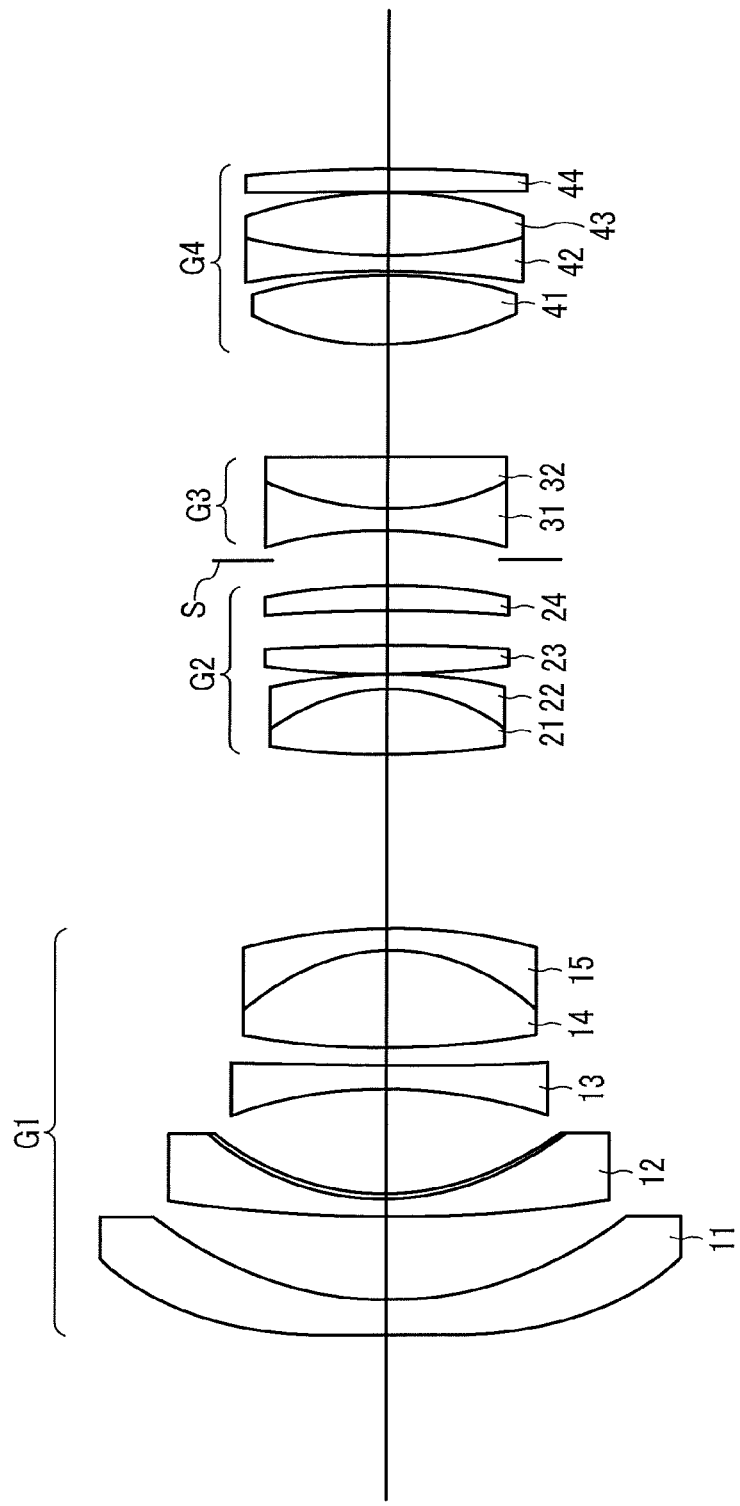
FIG. 5 is an illustration of a configuration of a zooming optical system focused on infinity at a short focal length end according to another embodiment of the present disclosure.
Figure 6:
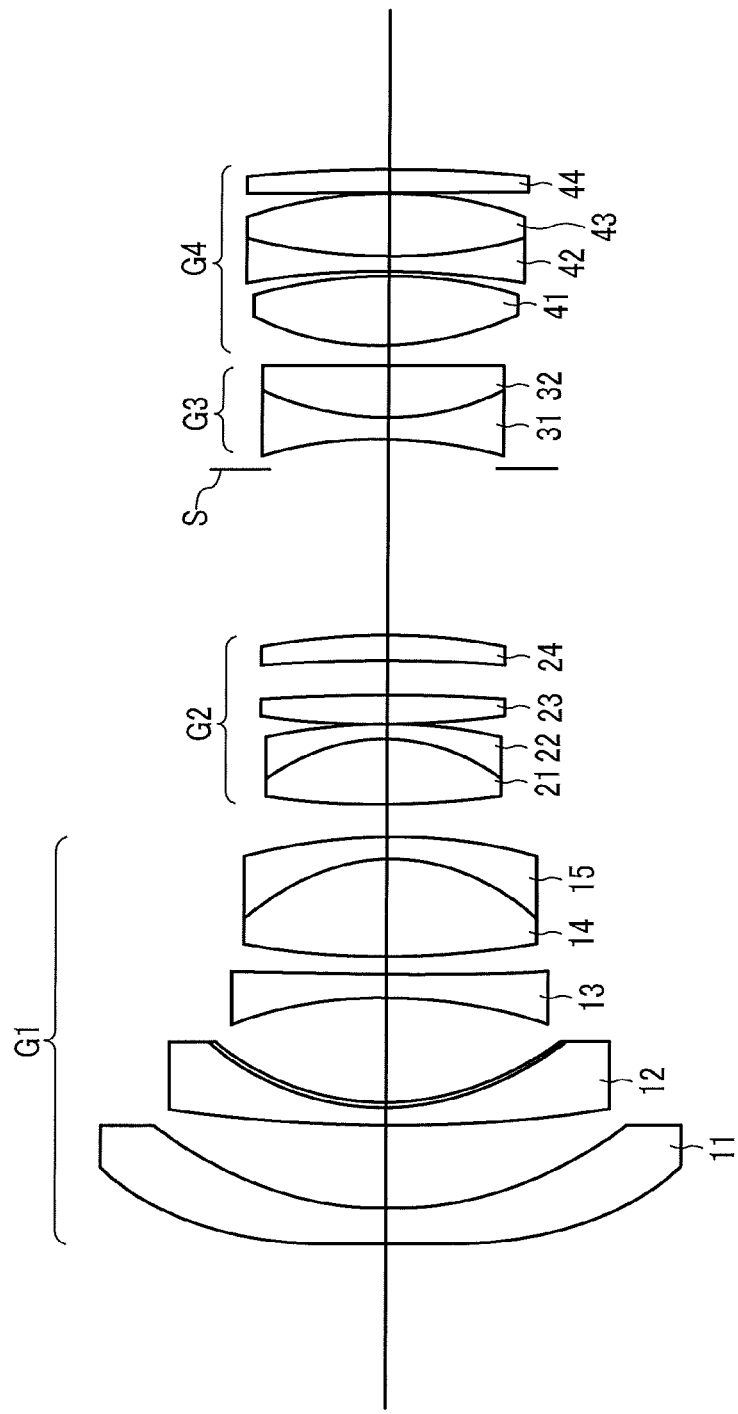
FIG. 6 is an illustration of a configuration of the zooming optical system of FIG. 5 focused on infinity at a long focal length end according to another embodiment of the present disclosure.

FIGS. 5 through 6D and Tables 5 through 8 represent numerical example 2 of the zooming optical system Z according to an embodiment of the present disclosure. FIG. 5 is a schematic diagram of a lens focused on infinity at the short focal length end. FIGS. 7A through 7D are aberration diagrams of the lens of FIG. 5. FIG. 6 is a schematic diagram of a lens focused on infinity at the long focal length end. FIGS. 8A through 8D are aberration diagrams of the lens of FIG. 6. Tables 5, 6, 7, and 8 represent data regarding surface (surface data), various data, data regarding aspherical surface (aspherical surface data), and data regarding lens group (lens group data), respectively.

The zooming optical system Z according to numerical example 2 has the same lens configuration as that of the zooming optical system Z according to numerical example 1 except for the following points:

1) The negative lens 13 of the first lens group G1 is a negative meniscus lens having a convex surface facing the image side.

2) The positive lens 24 of the second lens group G2 is a biconvex positive lens.

3) The positive lens 32 of the third lens group G3 is a biconvex positive lens.

4) The positive lens 44 of the fourth lens group G4 is a biconvex positive lens.

TABLE 5

Surface Data

| Surface Number | R | d | N(d) | ν(d) |
|---|---|---|---|---|
| 1* | 243.216 | 2.800 | 1.69350 | 53.2 |
| 2 | 26.713 | 7.038 | | |
| 3 | 227.332 | 1.700 | 1.72916 | 54.7 |
| 4 | 21.689 | 0.200 | 1.52972 | 42.7 |
| 5* | 23.963 | 8.450 | | |
| 6 | −36.137 | 1.972 | 1.81000 | 35.4 |
| 7 | −3310.327 | 1.500 | | |
| 8 | 58.989 | 7.978 | 1.54080 | 47.2 |
| 9 | −14.401 | 2.000 | 1.82000 | 46.6 |
| 10 | −34.589 | d10 | | |
| 11 | 74.390 | 5.320 | 1.57269 | 43.5 |
| 12 | −19.012 | 1.300 | 1.82000 | 46.3 |
| 13 | −59.238 | 0.200 | | |
| 14 | 84.857 | 2.128 | 1.55477 | 48.7 |
| 15 | −475.665 | 2.722 | | |
| 16 | 635.198 | 2.497 | 1.49700 | 81.6 |
| 17 | −48.263 | d17 | | |
| 18 Stop | ∞ | 2.508 | | |
| 19 | −38.807 | 1.350 | 1.80400 | 46.6 |
| 20 | 22.029 | 4.837 | 1.84666 | 23.8 |
| 21 | −845.682 | d21 | | |
| 22 | 21.126 | 5.715 | 1.43875 | 95.0 |
| 23 | −37.174 | 0.243 | | |
| 24 | −75.440 | 1.350 | 1.84666 | 23.8 |
| 25 | 31.970 | 5.003 | 1.49700 | 81.6 |
| 26 | −40.122 | 0.150 | | |
| 27* | 195.221 | 1.996 | 1.51633 | 64.1 |
| 28* | −78.600 | — | | |

*Rotationally Symmetric Aspherical Surface

TABLE 6

Various Data
Zooming Ratio 1.57

| | Short | Intermediate | Long |
|---|---|---|---|
| FNO. | 2.9 | 2.9 | 2.9 |
| f | 11.25 | 14.00 | 17.70 |
| W | 52.7 | 45.2 | 38.2 |
| Y | 14.24 | 14.24 | 14.24 |
| fB | 37.72 | 41.22 | 46.99 |
| L | 134.42 | 134.06 | 136.14 |
| d10 | 14.431 | 8.329 | 2.852 |
| d17 | 1.898 | 8.022 | 13.852 |
| d21 | 9.415 | 5.538 | 1.487 |

Short: Short Focal Length End,
Intermediate: Intermediate Focal length, and
Long: Long Focal Length End

TABLE 7

Aspherical Surface Data

| Surface Number | K | A4 | A6 | A8 | A10 | A12 |
|---|---|---|---|---|---|---|
| 1 | 0.000 | 0.3895E−04 | −0.1099E−06 | 0.3083E−09 | −0.4884E−12 | 0.3526E−15 |
| 5 | −0.153 | 0.6699E−04 | −0.3709E−06 | 0.1726E−08 | −0.6625E−11 | 0.0000E+00 |
| 27 | 0.000 | −0.2120E−04 | −0.1343E−06 | 0.9204E−09 | 0.6746E−13 | 0.5515E−14 |
| 28 | 0.000 | 0.8805E−05 | −0.6277E−07 | 0.1005E−08 | 0.0000E+00 | 0.0000E+00 |

TABLE 8

Lens Group Data

| Group | Starting Surface | Focal Length |
|---|---|---|
| 1 | 1 | −16.01 |
| 2 | 11 | 38.66 |
| 3 | 19 | −56.54 |
| 4 | 22 | 33.51 |

Numerical Example 3

Figure 9:
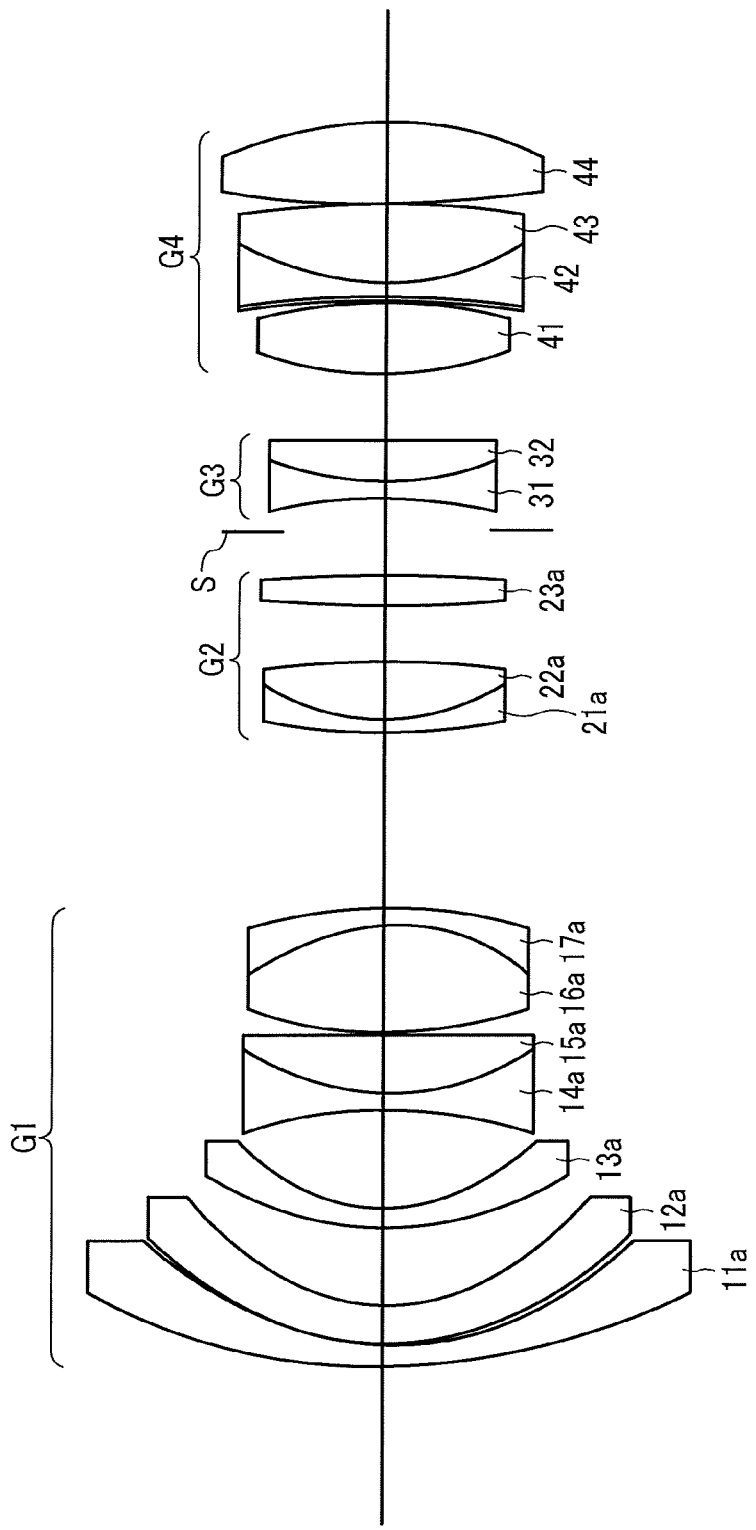
FIG. 9 is an illustration of a configuration of a zooming optical system focused on infinity at a short focal length end according to still another embodiment of the present disclosure.
Figure 10:
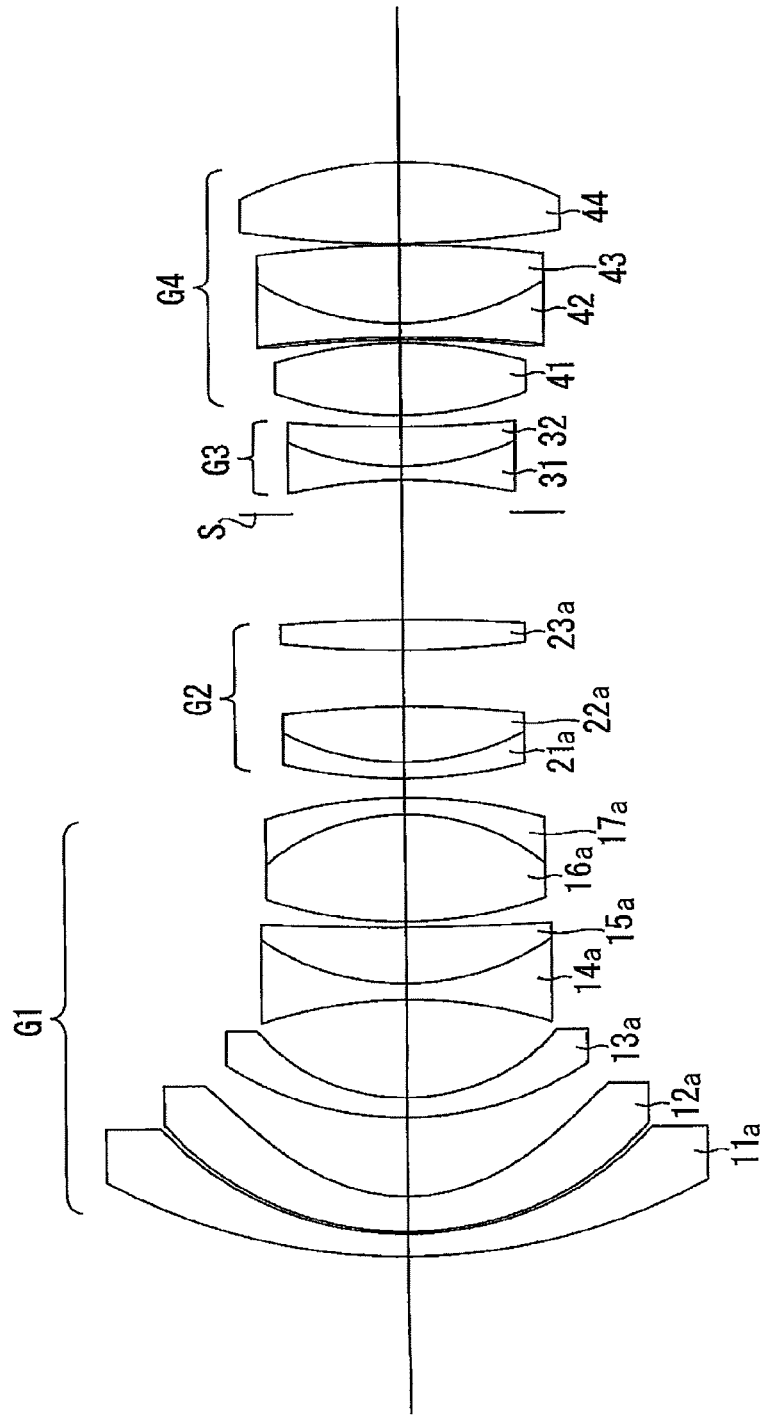
FIG. 10 is an illustration of a configuration of the zooming optical system of FIG. 9 focused on infinity at a long focal length end according to still another embodiment of the present disclosure.

FIGS. 9 through 12D and Tables 9 through 12 represent data of the zooming optical system Z according to numerical example 3. FIG. 9 is a schematic diagram of a lens focused on infinity at the short focal length end. FIGS. 11A through 11D are aberration diagrams of the lens of FIG. 9. FIG. 10 is a schematic diagram of a lens focused on infinity at the long focal length end. FIGS. 12A through 12D are aberration diagrams of the lens of FIG. 10. Table 9 represents surface data, Table 10 represents various data, Table 11 represents aspherical surface data, and Table 12 represents lens group data.

The zooming optical system Z according to numerical example 3 has the same lens configuration as that of the zooming optical system Z according to numerical example 1 except for the following points:

1) The first lens G1 includes a negative meniscus lens 11a with a convex surface facing the object side, a negative meniscus lens 12a with a convex surface facing the object side, a negative meniscus lens 13a having a convex surface facing the object side, a biconcave negative lens 14a, a positive meniscus lens 15a having a convex surface facing the object side, a biconvex positive lens 16a, and a negative meniscus lens 17a having a convex surface facing the image side, in that order from the object side. The negative meniscus lens 12a has an aspherical surface facing the image side. The biconcave negative lens 14a and the positive meniscus lens 15a are cemented to each other to form a cemented lens having negative refractive power. The biconvex positive lens 16a and the negative meniscus lens 17a are cemented to each other to form a cemented lens having positive refractive power.

2) The second lens group G2 includes a negative meniscus lens 21a having a convex surface facing the object side, a biconvex positive lens 22a, and a biconvex positive lens 23a in that order from the object side. The negative meniscus lens 21a and the biconvex positive lens 22a are cemented to each other.

3) The biconvex positive lens 41 of the fourth lens group G4 has an aspherical surface facing the image side.

4) The biconcave negative lens 42 of the fourth lens group G4 is a hybrid lens formed by bonding an aspherical surface layer made of synthetic resin material to the object-side surface of a glass lens.

5) The positive lens 44 of the fourth lens group G4 is a biconvex positive lens having both surfaces spherical

TABLE 9

Surface Data

| Surface Number | R | d | N(d) | ν(d) |
|---|---|---|---|---|
| 1 | 47.207 | 1.910 | 1.65000 | 60.2 |
| 2 | 25.298 | 0.180 | | |
| 3 | 24.406 | 3.000 | 1.52538 | 56.3 |
| 4* | 12.814 | 6.776 | | |
| 5 | 24.325 | 1.700 | 1.81600 | 46.6 |
| 6 | 14.951 | 8.395 | | |
| 7 | −34.415 | 1.381 | 1.80999 | 46.5 |
| 8 | 19.117 | 4.771 | 1.56247 | 42.2 |
| 9 | 196.040 | 0.500 | | |
| 10 | 31.675 | 9.174 | 1.54000 | 48.5 |
| 11 | −16.348 | 1.449 | 1.80400 | 46.6 |
| 12 | −34.521 | d12 | | |
| 13 | 36.312 | 1.404 | 1.85000 | 25.1 |
| 14 | 18.782 | 4.781 | 1.61702 | 36.3 |
| 15 | −71.849 | 4.800 | | |
| 16 | 76.485 | 2.580 | 1.60342 | 38.0 |
| 17 | −122.375 | d17 | | |
| 18Stop | ∞ | 2.873 | | |
| 19 | −35.565 | 1.220 | 1.80400 | 46.6 |
| 20 | 19.977 | 3.359 | 1.84666 | 23.8 |
| 21 | 91.242 | d21 | | |
| 22 | 25.941 | 6.207 | 1.49700 | 81.6 |
| 23* | −27.244 | 0.250 | | |
| 24* | −95.569 | 0.200 | 1.52972 | 42.7 |
| 25 | −91.464 | 1.200 | 1.91650 | 31.6 |
| 26 | 19.827 | 6.652 | 1.49700 | 81.6 |
| 27 | −78.444 | 0.150 | | |
| 28 | 73.631 | 6.975 | 1.49700 | 81.6 |
| 29 | −27.186 | — | | |

*Rotationally Symmetric Aspherical Surface

TABLE 10

Various Data
Zooming Ratio 1.56

| | Short | Intermediate | Long |
|---|---|---|---|
| FNO. | 2.8 | 2.8 | 2.8 |
| f | 11.29 | 14.03 | 17.62 |
| W | 52.6 | 45.4 | 38.6 |
| Y | 14.24 | 14.24 | 14.24 |
| fB | 36.72 | 40.85 | 47.38 |
| L | 143.32 | 140.88 | 141.01 |
| d12 | 14.885 | 7.647 | 1.664 |
| d17 | 3.792 | 6.807 | 9.087 |
| d21 | 6.037 | 3.691 | 0.989 |

Short: Short Focal Length End,
Intermediate: Intermediate Focal length, and
Long: Long Focal Length End

TABLE 11

| | | | AsphericalSurface Data | | | |
|---|---|---|---|---|---|---|
| Surface Number | K | A4 | A6 | A8 | A10 | A12 |
| 4 | −1.000 | 0.1120E−04 | −0.4885E−07 | 0.2045E−09 | −0.1364E−11 | 0.1438E−14 |
| 23 | 0.000 | 0.3473E−04 | −0.3918E−06 | 0.3588E−08 | −0.1068E−10 | 0.0000E+00 |
| 24 | 0.000 | 0.2382E−05 | −0.3540E−06 | 0.3245E−08 | −0.8728E−11 | 0.0000E+00 |

TABLE 12

| | Lens Group Data | |
|---|---|---|
| Group | Starting Surface | Focal Length |
| 1 | 1 | −15.83 |
| 2 | 13 | 33.18 |
| 3 | 19 | −33.11 |
| 4 | 22 | 30.02 |

Numerical Example 4

Figure 13:
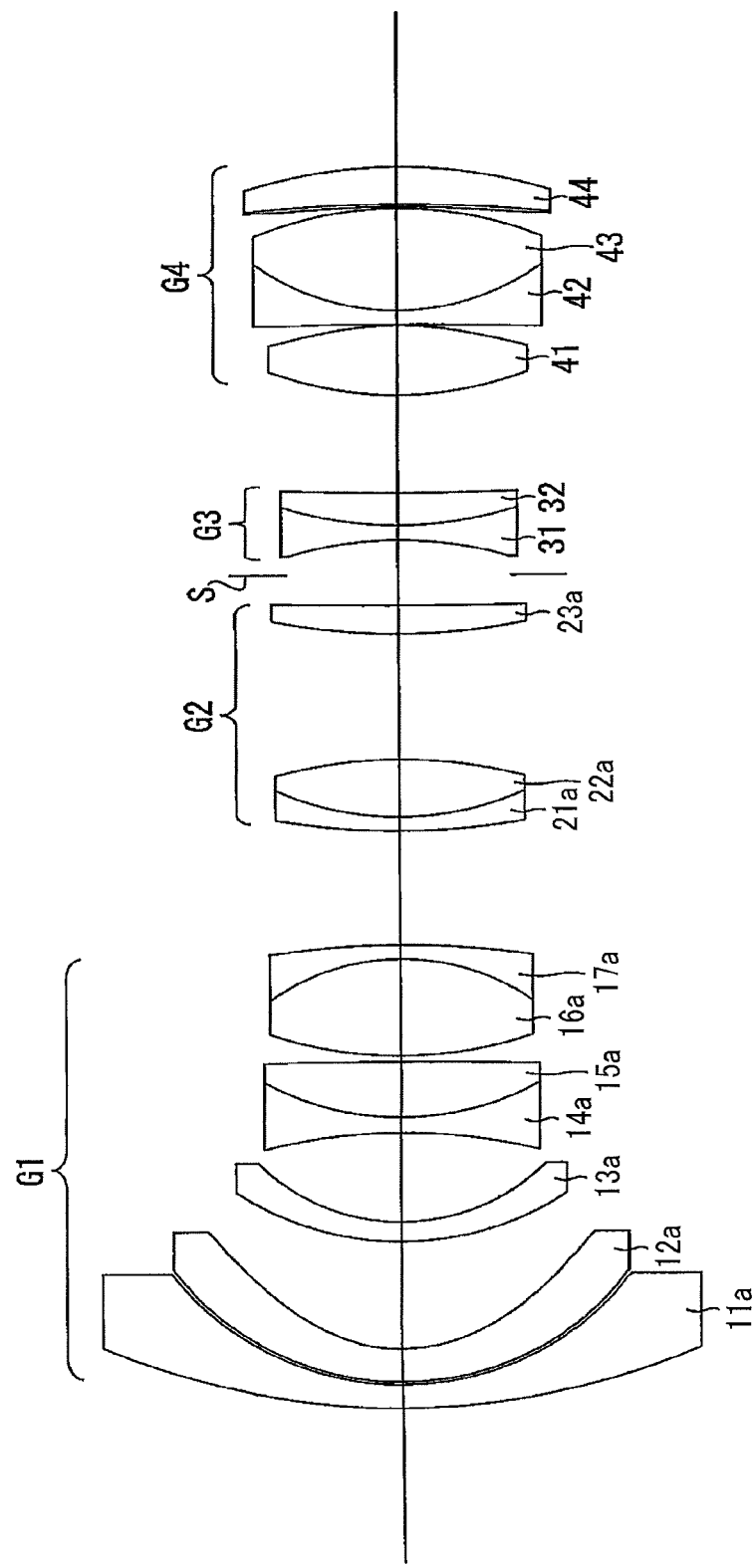
FIG. 13 is an illustration of a configuration of a zooming optical system focused on infinity at a short focal length end according to yet another embodiment of the present disclosure.
Figure 14:
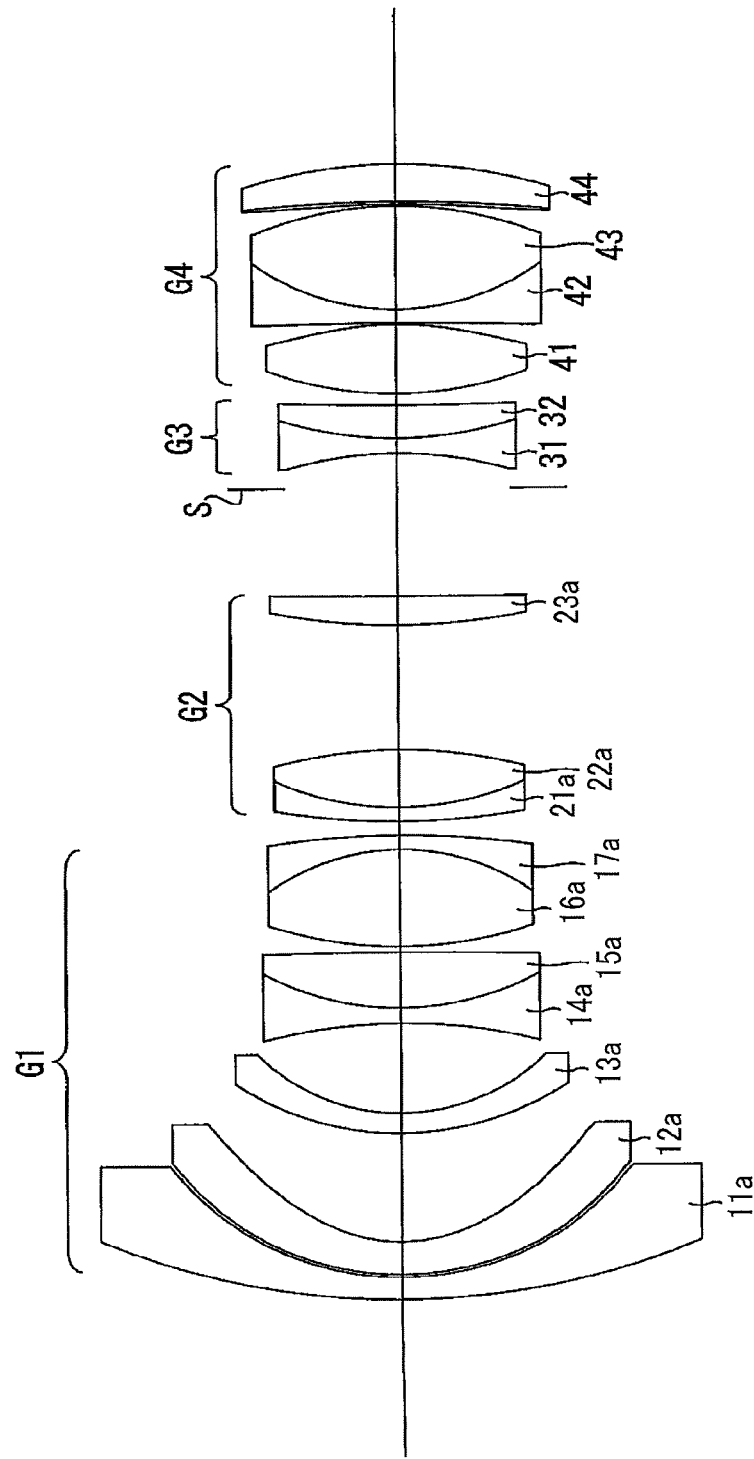
FIG. 14 is an illustration of a configuration of the zooming optical system of FIG. 13 focused on infinity at a long focal length end according to still another embodiment of the present disclosure.

FIGS. 13 through 16D and Tables 13 through 16 represent data of the zooming optical system Z according to numerical example 4. FIG. 13 is a schematic diagram of a lens focused on infinity at the short focal length end. FIGS. 15A through 15D are aberration diagrams of the lens of FIG. 13. FIG. 14 is a schematic diagram of a lens focused on infinity at the long focal length end. FIGS. 16A through 16D are aberration diagrams of the lens of FIG. 14. Table 13 represents surface data, Table 14 represents various data, Table 15 represents aspherical surface data, and Table 16 represents lens group data.

The zooming optical system Z according to numerical example 4 has the same lens configuration as that of the zooming optical system Z according to numerical example 3 except for the following points:

1) The positive lens 15a of the first lens group G1 is a biconvex positive lens;
2) The positive lens 23a of the second lens group G2 is a positive meniscus lens having a convex surface facing the object side;
3) The biconcave negative lens 42 of the fourth lens group G4 has a spherical surface facing the object side; and
4) The positive lens 44 of the fourth lens group G4 is a positive meniscus lens having a convex surface facing the image side, and is also a hybrid lens formed by bonding an aspherical surface layer made of synthetic resin material to the object-side surface of a glass lens.

TABLE 13

| | Surface Data | | | |
|---|---|---|---|---|
| Surface Number | R | d | N(d) | ν(d) |
| 1 | 57.761 | 1.910 | 1.67790 | 55.3 |
| 2 | 22.263 | 0.226 | | |
| 3 | 21.838 | 2.800 | 1.52538 | 56.3 |
| 4* | 12.000 | 9.226 | | |
| 5 | 22.442 | 1.700 | 1.81600 | 46.6 |
| 6 | 15.329 | 7.715 | | |
| 7 | −41.454 | 1.300 | 1.80610 | 40.9 |
| 8 | 21.289 | 4.790 | 1.54814 | 45.8 |
| 9 | −414.635 | 0.500 | | |
| 10 | 30.866 | 8.279 | 1.54814 | 45.8 |
| 11 | −17.011 | 1.200 | 1.81600 | 46.6 |
| 12 | −65.332 | d12 | | |
| 13 | 54.191 | 1.200 | 1.84666 | 23.8 |
| 14 | 22.757 | 4.929 | 1.63980 | 34.5 |
| 15 | −35.868 | 10.749 | | |
| 16 | 46.856 | 2.475 | 1.67270 | 32.1 |
| 17 | 588.690 | d17 | | |
| 18Stop | ∞ | 3.008 | | |
| 19 | −29.206 | 1.300 | 1.80400 | 46.6 |
| 20 | 28.581 | 2.811 | 1.84666 | 23.8 |
| 21 | 253.385 | d21 | | |
| 22 | 27.469 | 5.957 | 1.49700 | 81.6 |
| 23* | −24.018 | 0.100 | | |
| 24 | −309.038 | 1.200 | 1.91650 | 31.6 |
| 25 | 18.361 | 8.827 | 1.49700 | 81.6 |
| 26 | −28.222 | 0.150 | | |
| 27* | −72.309 | 0.200 | 1.52972 | 42.7 |
| 28 | −111.285 | 3.198 | 1.49700 | 81.6 |
| 29 | −38.000 | — | | |

*Rotationally Symmetric Aspherical Surface

TABLE 14

| | Various Data Zooming Ratio 1.56 | | |
|---|---|---|---|
| | Short | Intermediate | Long |
| FNO. | 2.8 | 2.8 | 2.8 |
| f | 11.28 | 14.01 | 17.60 |
| W | 52.7 | 45.4 | 38.7 |
| Y | 14.24 | 14.24 | 14.24 |
| fB | 36.71 | 41.01 | 48.10 |
| L | 143.31 | 142.92 | 145.21 |
| d12 | 9.850 | 5.174 | 1.184 |
| d17 | 2.614 | 6.381 | 9.188 |
| d21 | 8.385 | 4.609 | 0.989 |

Short: Short Focal Length End,
Intermediate: Intermediate Focal length, and
Long: Long Focal Length End

TABLE 15

Aspherical Surface Data

| Surface Number | K | A4 | A6 | A8 | A10 | A12 |
|---|---|---|---|---|---|---|
| 4 | −1.000 | 0.1072E−04 | −0.1908E−08 | 0.4251E−10 | −0.7022E−12 | 0.7703E−15 |
| 23 | 0.000 | 0.5983E−04 | −0.1219E−06 | 0.2090E−09 | 0.0000E+00 | 0.0000E+00 |
| 27 | 0.000 | 0.2034E−04 | −0.9424E−08 | −0.2202E−09 | 0.2356E−11 | −0.4307E−14 |

TABLE 16

Lens Group Data

| Group | Starting Surface | Focal Length |
|---|---|---|
| 1 | 1 | −12.39 |
| 2 | 13 | 29.94 |
| 3 | 19 | −33.85 |
| 4 | 22 | 30.63 |

Numerical Example 5

Figure 17:
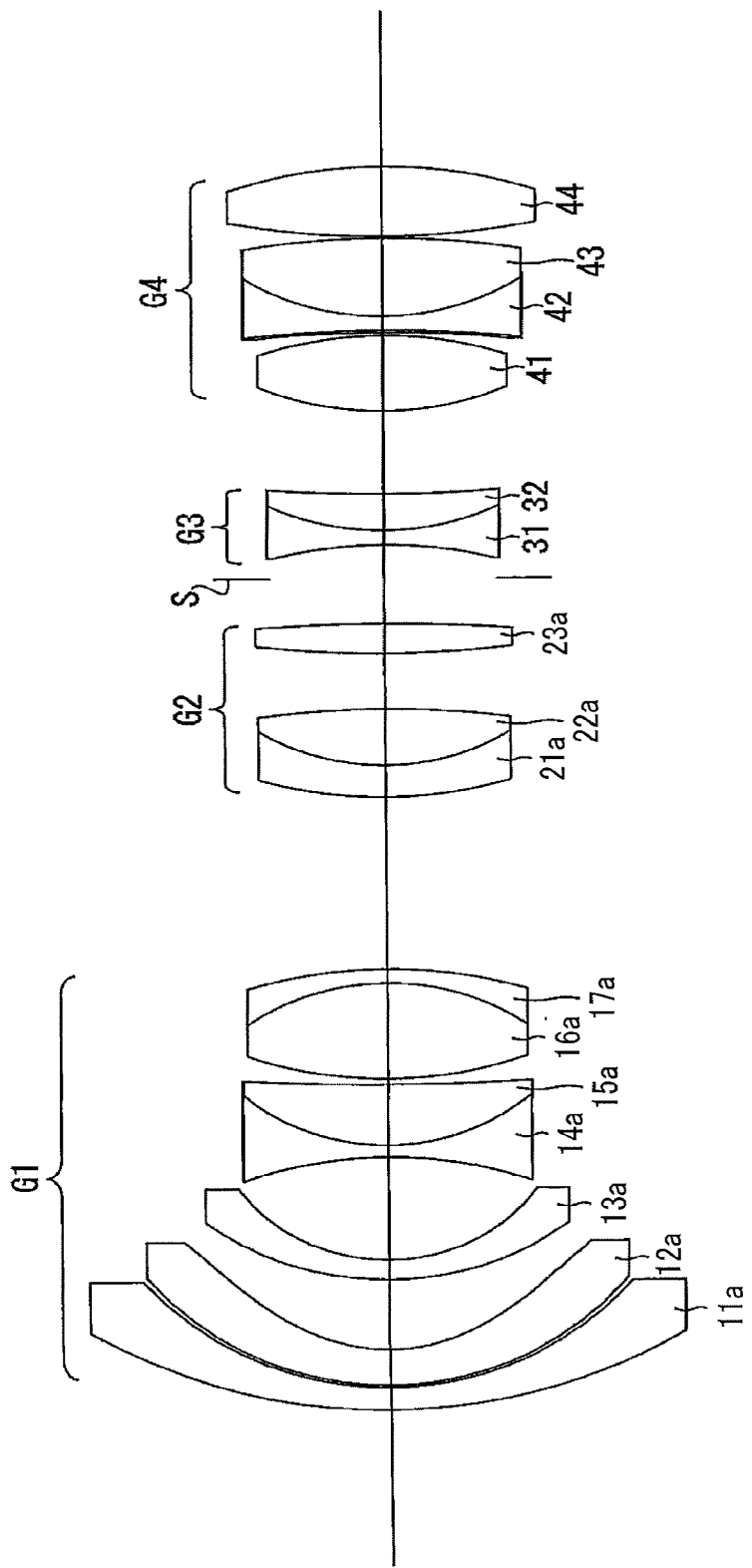
FIG. 17 is an illustration of a configuration of a zooming optical system focused on infinity at a short focal length end according to further embodiment of the present disclosure.
Figure 18:
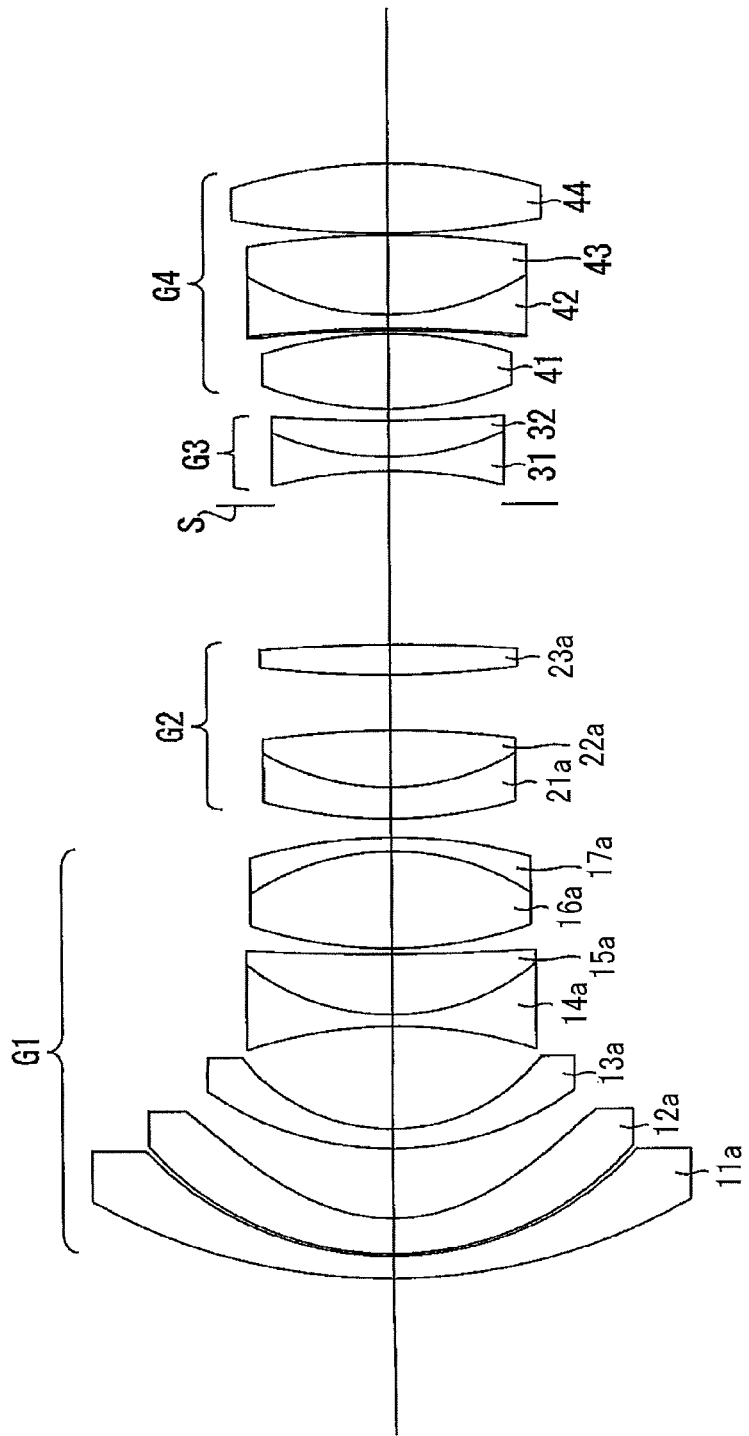
FIG. 18 is an illustration of a configuration of the zooming optical system of FIG. 17 focused on infinity at a long focal length end according to further another embodiment of the present disclosure.

FIGS. 17 through 20D and Tables 17 through 20 represent data of the zooming optical system Z according to numerical example 5. FIG. 17 is a schematic diagram of a lens focused on infinity at the short focal length end. FIGS. 19A through 19D are aberration diagrams of the lens of FIG. 17. FIG. 18 is a schematic diagram of a lens focused on infinity at the long focal length end. FIGS. 20A through 20D are aberration diagrams of the lens of FIG. 18. Table 17 represents surface data, Table 18 represents various data, Table 19 represents aspherical surface data, and Table 20 represents lens group data.

The zooming optical system Z according to numerical example 5 has the same lens configuration as that of the zooming optical system Z according to numerical example 3.

TABLE 17

Surface Data

| Surface Number | R | d | N(d) | ν(d) |
|---|---|---|---|---|
| 1 | 45.468 | 1.910 | 1.65000 | 60.2 |
| 2 | 25.315 | 0.180 | | |
| 3 | 24.421 | 3.000 | 1.52538 | 56.3 |
| 4* | 13.087 | 5.996 | | |
| 5 | 23.492 | 1.700 | 1.82000 | 46.0 |
| 6 | 14.448 | 8.806 | | |

TABLE 17-continued

Surface Data

| Surface Number | R | d | N(d) | ν(d) |
|---|---|---|---|---|
| 7 | −33.696 | 1.000 | 1.81000 | 46.5 |
| 8 | 17.284 | 5.151 | 1.54000 | 46.0 |
| 9 | 173.777 | 0.500 | | |
| 10 | 32.066 | 8.236 | 1.54000 | 48.6 |
| 11 | −18.978 | 1.200 | 1.80400 | 46.6 |
| 12 | −36.810 | d12 | | |
| 13 | 34.521 | 2.701 | 1.85000 | 26.5 |
| 14 | 18.344 | 4.860 | 1.60000 | 38.4 |
| 15 | −71.966 | 4.800 | | |
| 16 | 78.577 | 2.580 | 1.60342 | 38.0 |
| 17 | −128.192 | d17 | | |
| 18 Stop | ∞ | 2.895 | | |
| 19 | −33.829 | 1.220 | 1.80000 | 47.3 |
| 20 | 20.819 | 3.122 | 1.85000 | 23.6 |
| 21 | 117.441 | d21 | | |
| 22 | 24.711 | 6.460 | 1.49700 | 81.6 |
| 23* | −27.418 | 0.250 | | |
| 24* | −115.024 | 0.200 | 1.52972 | 42.7 |
| 25 | −93.537 | 1.200 | 1.91650 | 31.6 |
| 26 | 20.038 | 6.754 | 1.49700 | 81.6 |
| 27 | −63.727 | 0.150 | | |
| 28 | 62.748 | 5.981 | 1.49700 | 81.6 |
| 29 | −37.225 | — | | |

*Rotationally Symmetric Aspherical Surface

TABLE 18

Various Data
Zooming Ratio 1.66

| | Short | Intermediate | Long |
|---|---|---|---|
| FNO. | 2.8 | 2.8 | 2.8 |
| f | 11.29 | 14.01 | 18.76 |
| W | 52.6 | 45.3 | 36.6 |
| Y | 14.24 | 14.24 | 14.24 |
| fB | 36.72 | 40.77 | 49.30 |
| L | 143.32 | 142.19 | 144.69 |
| d12 | 14.777 | 8.274 | 1.617 |
| d17 | 3.874 | 7.690 | 11.932 |
| d21 | 7.097 | 4.599 | 0.989 |

Short: Short Focal Length End,
Intermediate: Intermediate Focal length, and
Long: Long Focal Length End

TABLE 19

Aspherical Surface Data

| Surface Number | K | A4 | A6 | A8 | A10 | A12 |
|---|---|---|---|---|---|---|
| 4 | −1.000 | 0.7372E−05 | −0.6609E−07 | 0.2142E−09 | −0.1228E−11 | 0.1550E−14 |
| 23 | 0.000 | 0.3151E−04 | −0.1891E−06 | −0.1541E−09 | 0.4609E−11 | 0.0000E+00 |
| 24 | 0.000 | 0.3123E−05 | −0.1923E−06 | −0.7272E−10 | 0.3649E−11 | 0.2509E−14 |

TABLE 20

Lens Group Data

| Group | Starting Surface | Focal Length |
|---|---|---|
| 1 | 1 | −11.51 |
| 2 | 13 | 34.01 |
| 3 | 19 | −34.70 |
| 4 | 22 | 30.03 |

Numerical Example 6

Figure 21:
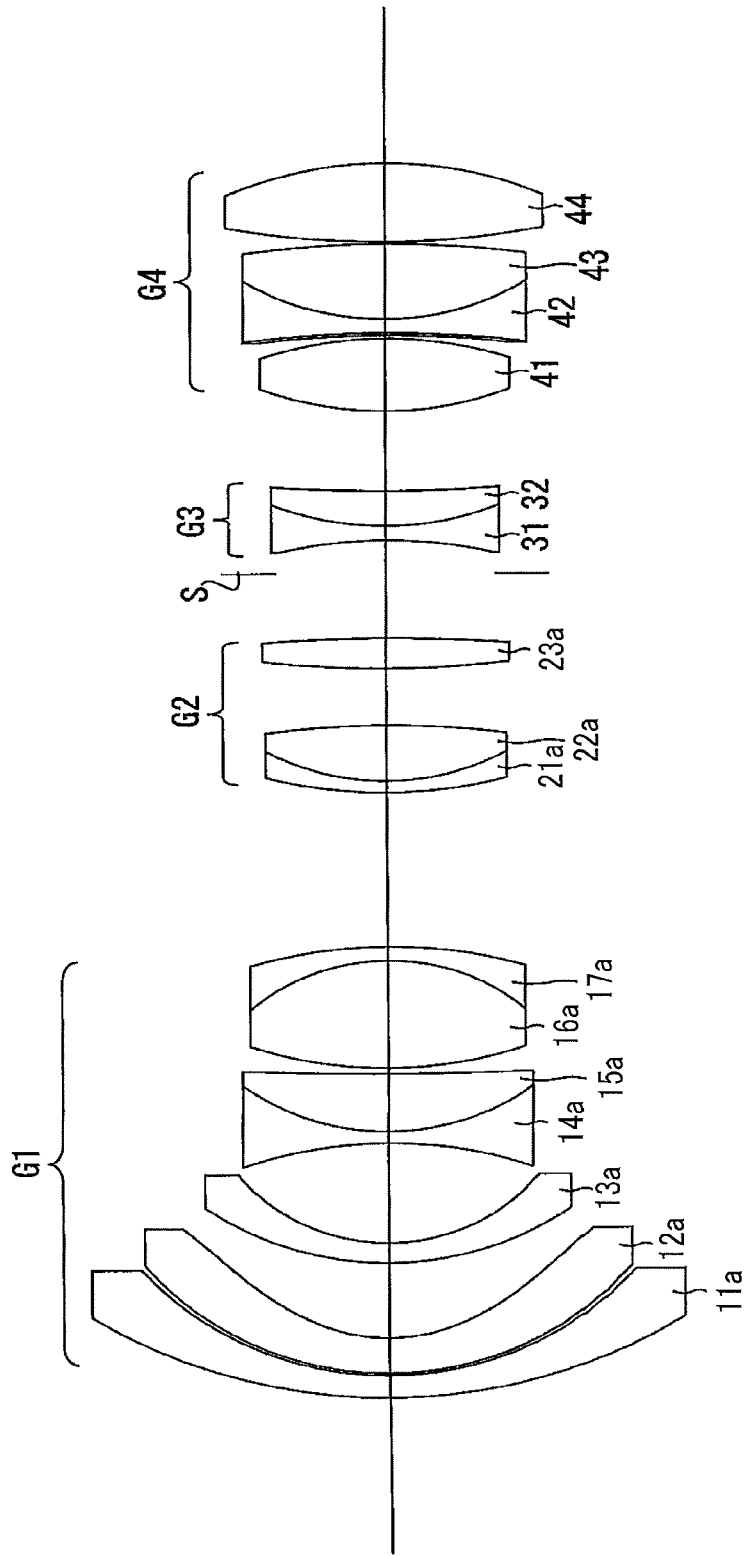
FIG. 21 is an illustration of a configuration of a zooming optical system focused on infinity at a short focal length end according to still further embodiment of the present disclosure.
Figure 22:
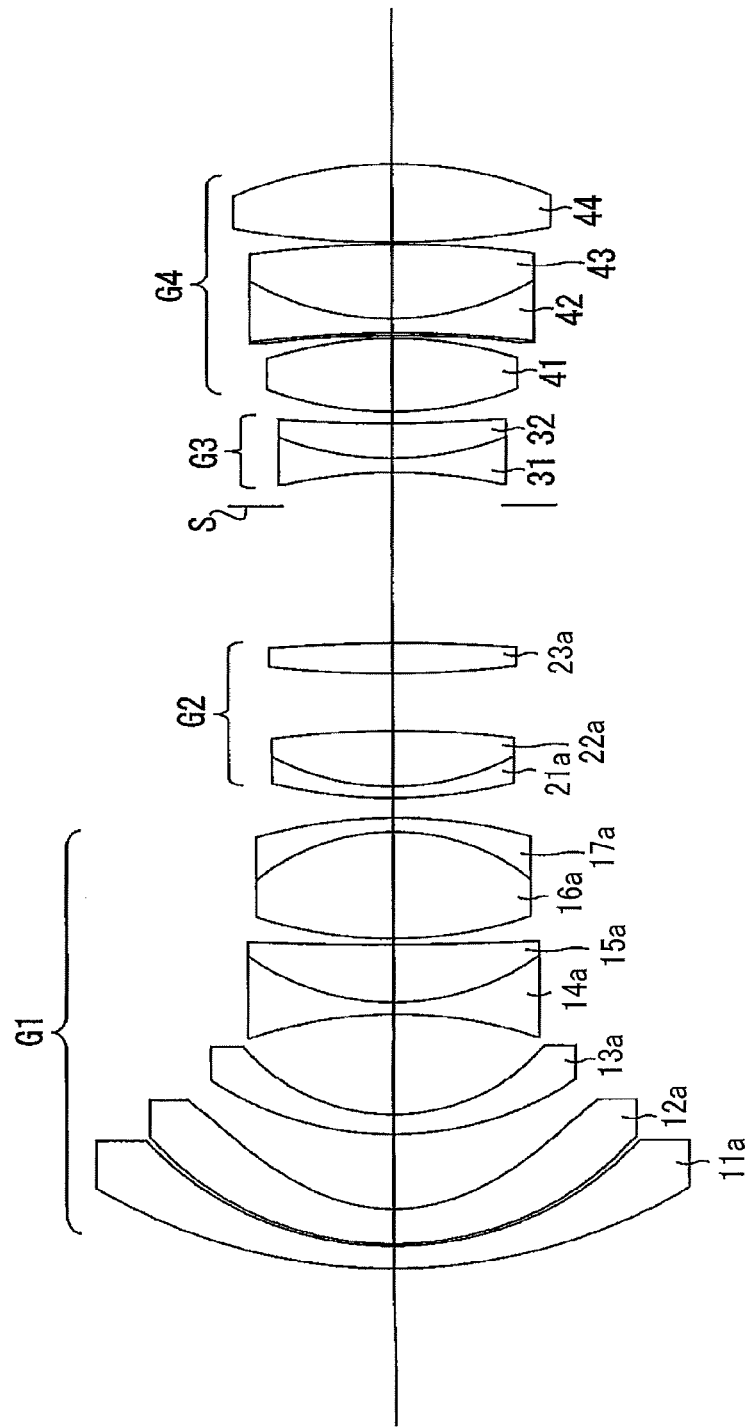
FIG. 22 is an illustration of a configuration of the zooming optical system of FIG. 21 focused on infinity at a long focal length end according to still further another embodiment of the present disclosure.

FIGS. 21 through 24D and Tables 21 through 24 represent data of the zooming optical system Z according to numerical example 6. FIG. 21 is a schematic diagram of a lens focused on infinity at the short focal length end. FIGS. 23A through 23D are aberration diagrams of the lens of FIG. 21. FIG. 22 is a schematic diagram of a lens focused on infinity at the long focal length end. FIGS. 24A through 24D are aberration diagrams of the lens of FIG. 22. Table 21 represents surface data, Table 22 represents various data, Table 23 represents aspherical surface data, and Table 24 represents lens group data.

The zooming optical system Z according to numerical example 6 has the same lens configuration as that of the zooming optical system Z according to numerical examples 3 and 5.

TABLE 21

Surface Data

| Surface Number | R | d | N(d) | ν(d) |
|---|---|---|---|---|
| 1 | 43.138 | 1.910 | 1.74649 | 51.7 |
| 2 | 25.541 | 0.180 | | |
| 3 | 24.617 | 3.000 | 1.52538 | 56.3 |
| 4* | 12.994 | 6.408 | | |
| 5 | 24.619 | 1.700 | 1.81600 | 46.6 |
| 6 | 15.043 | 8.527 | | |
| 7 | −33.246 | 1.006 | 1.81000 | 46.5 |
| 8 | 18.703 | 4.929 | 1.54000 | 46.0 |
| 9 | 259.129 | 0.500 | | |
| 10 | 32.222 | 9.180 | 1.54018 | 47.3 |
| 11 | −16.233 | 1.200 | 1.80400 | 46.6 |
| 12 | −36.494 | d12 | | |

TABLE 21-continued

Surface Data

| Surface Number | R | d | N(d) | ν(d) |
|---|---|---|---|---|
| 13 | 35.666 | 1.000 | 1.85000 | 28.4 |
| 14 | 18.999 | 4.780 | 1.60000 | 38.5 |
| 15 | −68.298 | 4.881 | | |
| 16 | 76.994 | 2.580 | 1.60342 | 38.0 |
| 17 | −123.191 | d17 | | |
| 18 Stop | ∞ | 2.861 | | |
| 19 | −35.715 | 1.220 | 1.80400 | 46.6 |
| 20 | 23.114 | 3.013 | 1.84666 | 23.8 |
| 21 | 118.817 | d21 | | |
| 22 | 26.463 | 6.224 | 1.49700 | 81.6 |
| 23* | −27.281 | 0.250 | | |
| 24* | −95.033 | 0.200 | 1.52972 | 42.7 |
| 25 | −85.453 | 1.200 | 1.91650 | 31.6 |
| 26 | 21.052 | 6.392 | 1.49700 | 81.6 |
| 27 | −75.840 | 0.150 | | |
| 28 | 64.560 | 6.759 | 1.49700 | 81.6 |
| 29 | −30.148 | — | | |

*Rotationally Symmetric Aspherical Surface

TABLE 22

Various Data
Zooming Ratio 1.56

| | Short | Intermediate | Long |
|---|---|---|---|
| FNO. | 2.8 | 2.8 | 2.8 |
| f | 11.29 | 14.03 | 17.62 |
| W | 52.6 | 45.4 | 38.6 |
| Y | 14.24 | 14.24 | 14.24 |
| fB | 36.72 | 41.10 | 48.23 |
| L | 142.31 | 141.29 | 142.76 |
| d12 | 13.152 | 7.031 | 1.712 |
| d17 | 5.514 | 9.171 | 11.778 |
| d21 | 6.876 | 3.937 | 0.989 |

Short: Short Focal Length End,
Intermediate: Intermediate Focal length, and
Long: Long Focal Length End

TABLE 23

Aspherical Surface Data

| Surface Number | K | A4 | A6 | A8 | A10 | A12 |
|---|---|---|---|---|---|---|
| 4 | −1.000 | 0.8240E−05 | −0.5831E−07 | 0.1814E−09 | −0.1351E−11 | 0.1753E−14 |
| 23 | 0.000 | 0.3195E−04 | −0.1829E−06 | −0.6981E−10 | 0.4274E−11 | 0.0000E+00 |
| 24 | 0.000 | 0.9289E−06 | −0.1595E−06 | −0.3974E−09 | 0.7327E−11 | −0.1026E−13 |

TABLE 24

Lens Group Data

| Group | Starting Surface | Focal Length |
|---|---|---|
| 1 | 1 | −14.60 |
| 2 | 13 | 33.35 |
| 3 | 19 | −35.57 |
| 4 | 22 | 30.03 |

Numerical Example 7

Figure 25:
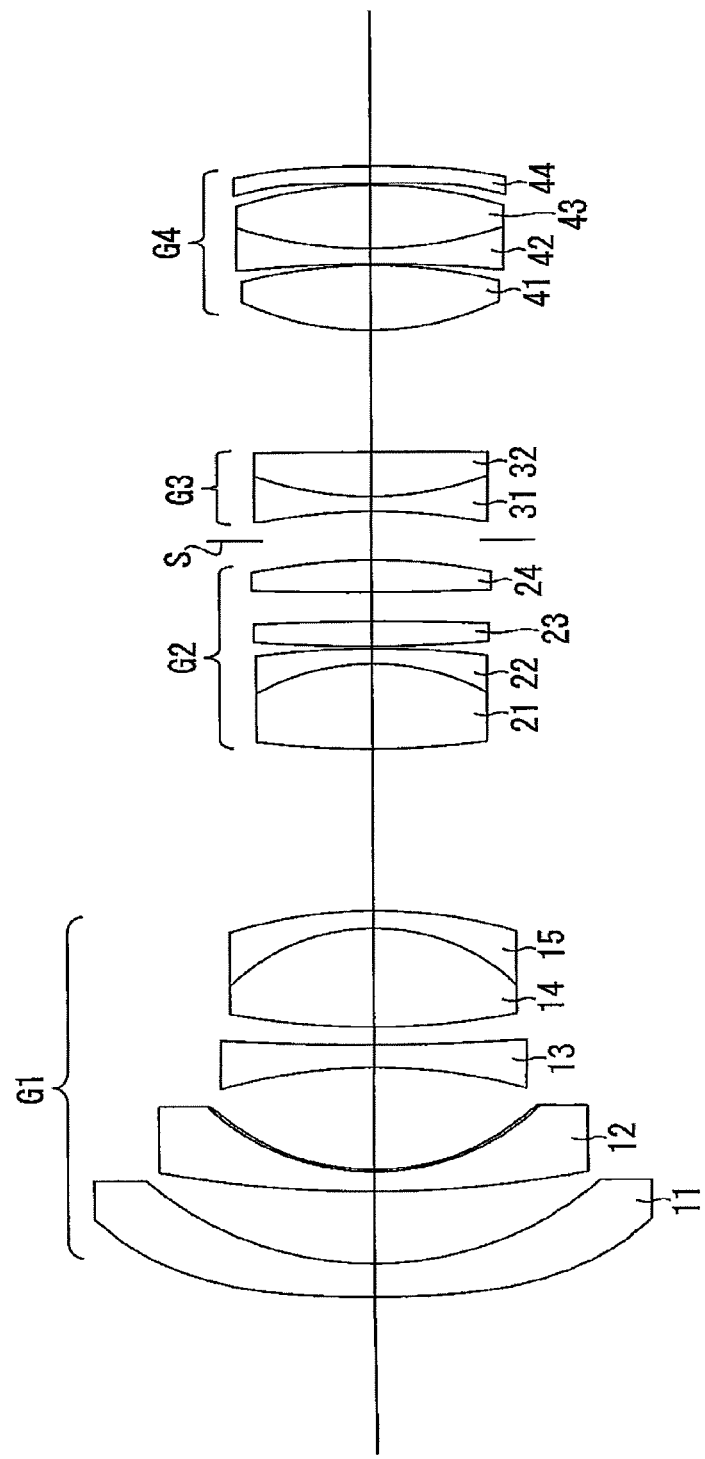
FIG. 25 is an illustration of a configuration of a zooming optical system focused on infinity at a short focal length end according to yet further embodiment of the present disclosure.
Figure 26:
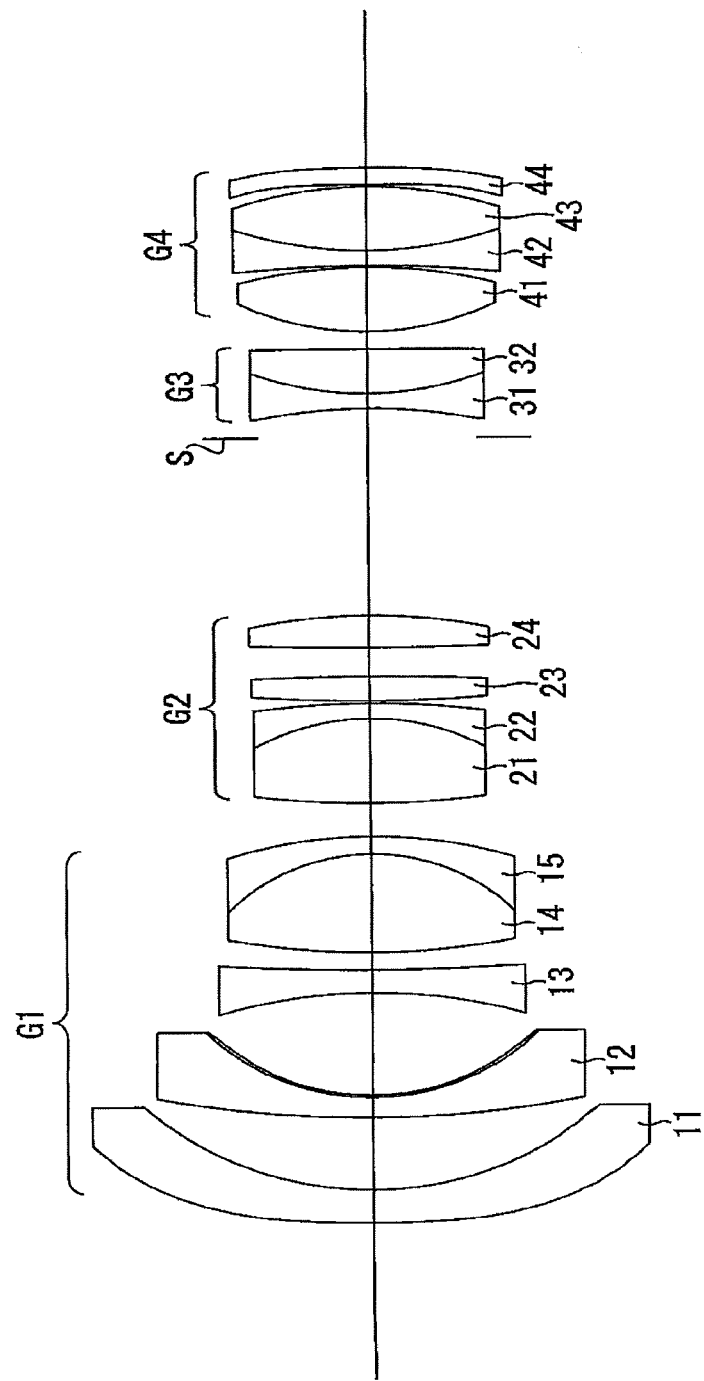
FIG. 26 is an illustration of a configuration of the zooming optical system of FIG. 25 focused on infinity at a long focal length end according to yet further another embodiment of the present disclosure.
Figure 29:
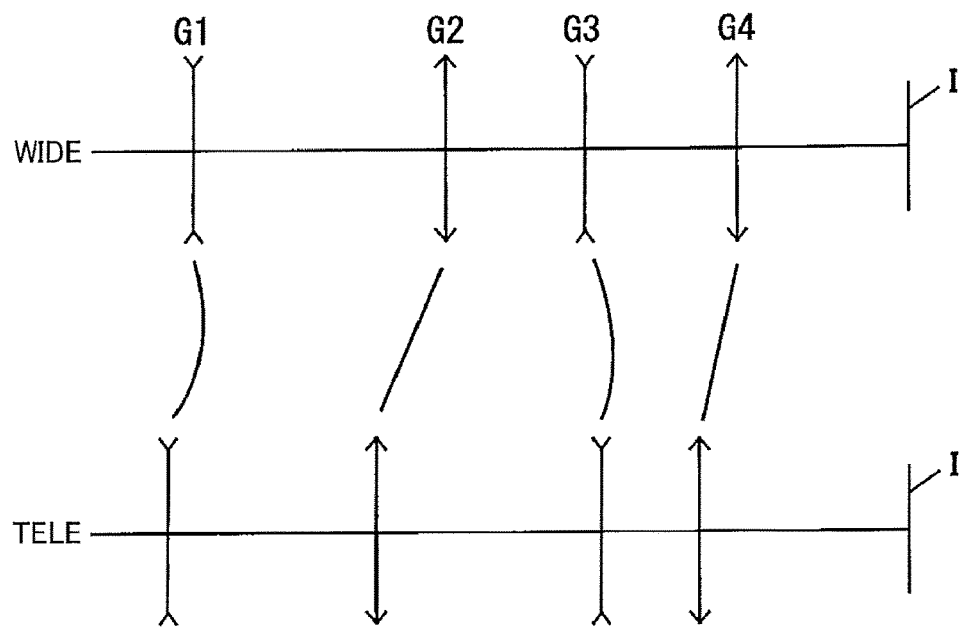
FIG. 29 is an illustration of movement paths of lens groups in the zooming optical system of FIG. 1.
Figure 30:
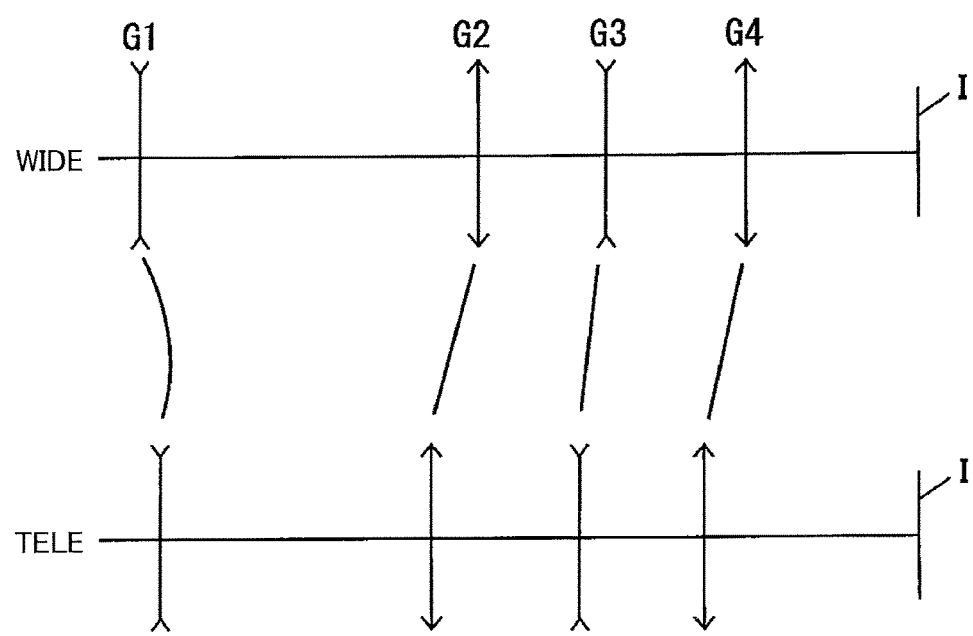
FIG. 30 is an illustration of movement paths of lens groups in the zooming optical system of FIG. 5.
Figure 31:
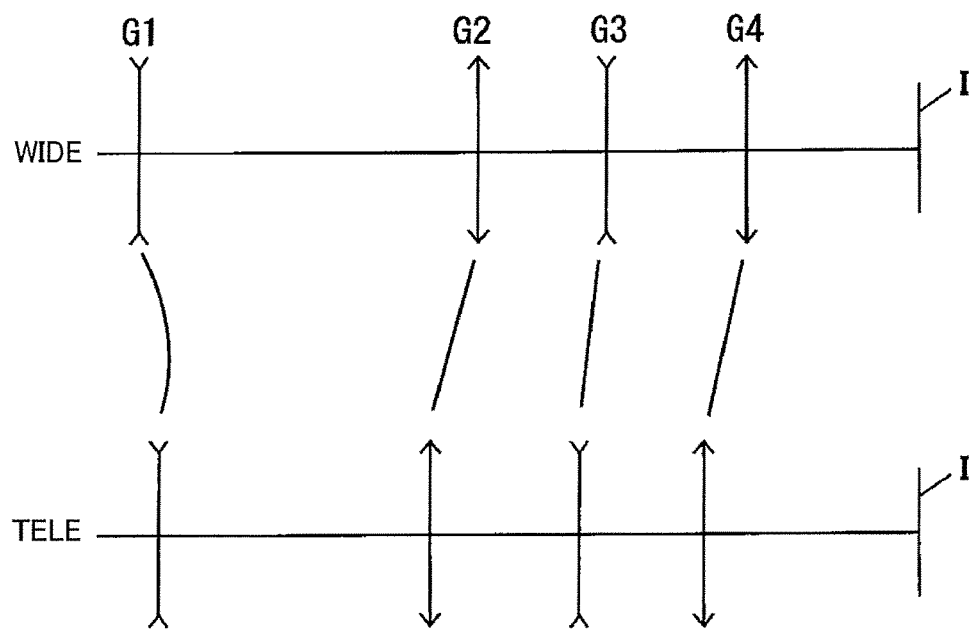
FIG. 31 is an illustration of movement paths of lens groups in the zooming optical system of FIG. 9.
Figure 32:
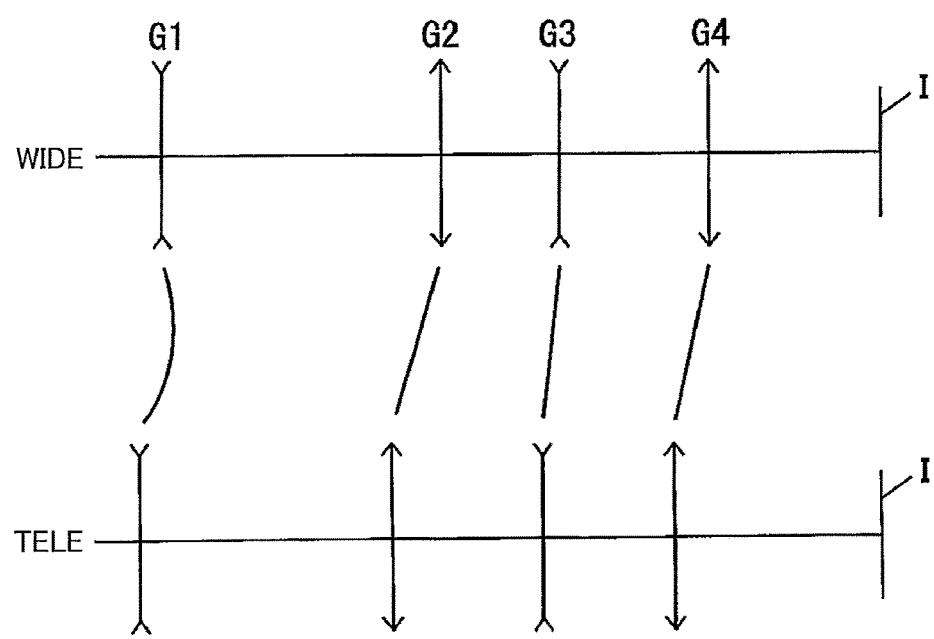
FIG. 32 is an illustration of movement paths of lens groups in the zooming optical system of FIG. 13.
Figure 33:
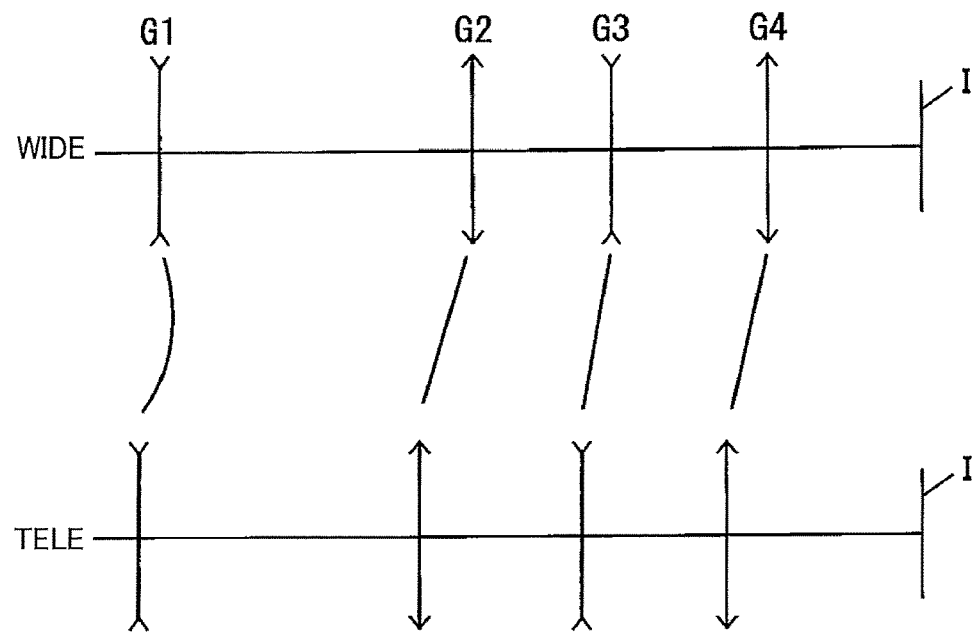
FIG. 33 is an illustration of movement paths of lens groups in the zooming optical system of FIG. 17.
Figure 34:
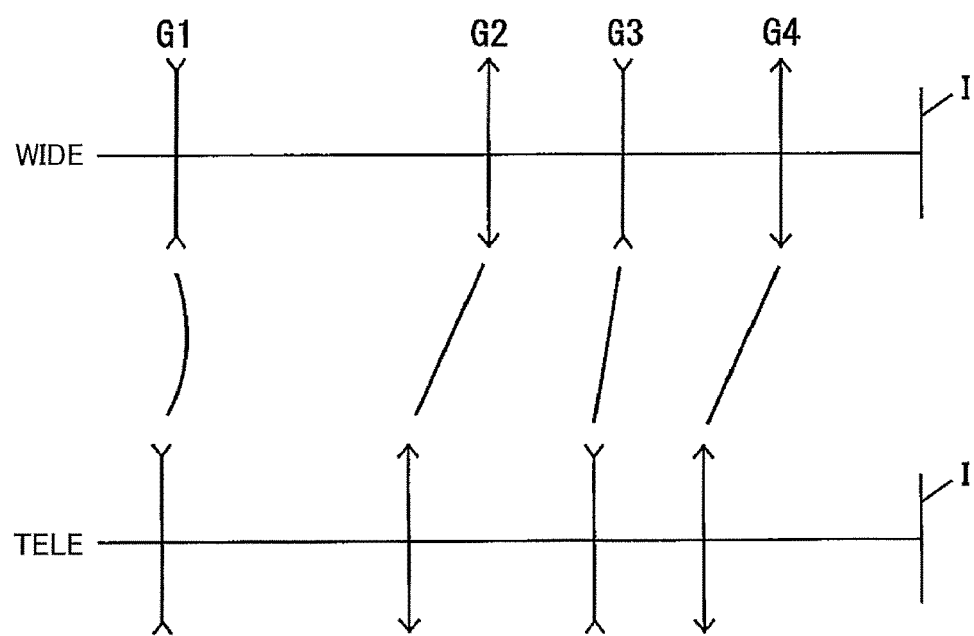
FIG. 34 is an illustration of movement paths of lens groups in the zooming optical system of FIG. 21.
Figure 35:
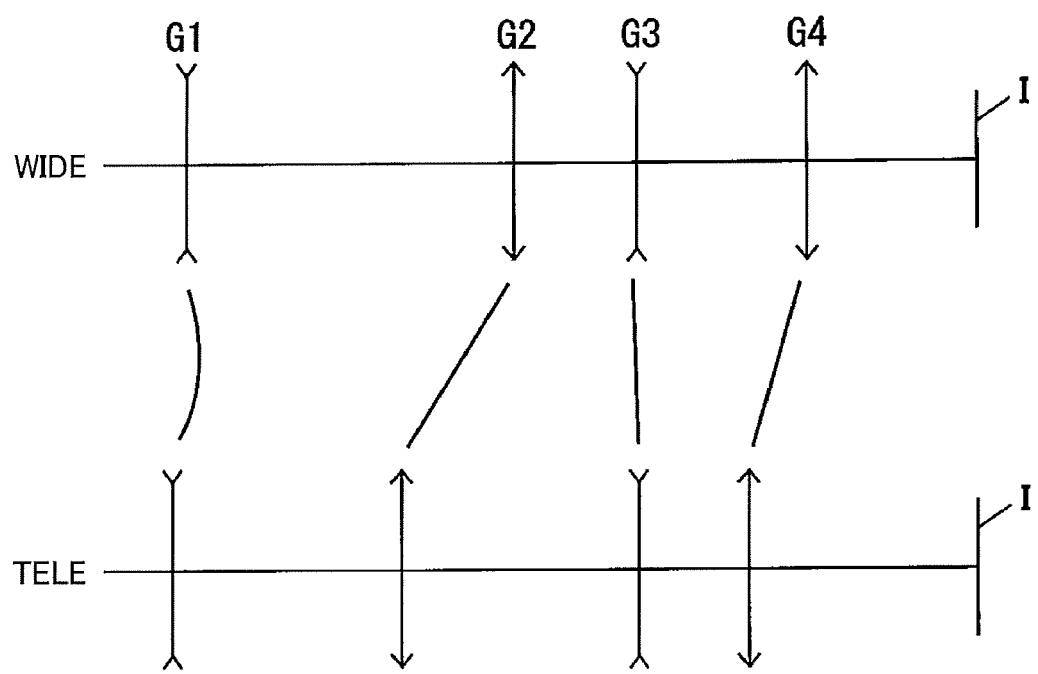
FIG. 35 is an illustration of movement paths of lens groups in the zooming optical system of FIG. 25.

FIGS. 25 through 28D and Tables 25 through 28 represent data of the zooming optical system Z according to numerical example 7. FIG. 25 is a schematic diagram of a lens focused on infinity at the short focal length end. FIGS. 27A through 27D are aberration diagrams of the lens of FIG. 25. FIG. 26 is a schematic diagram of a lens focused on infinity at the long focal length end. FIGS. 28A through 28D are aberration diagrams of the lens of FIG. 26. Table 25 represents surface data, Table 26 represents various data, Table 27 represents aspherical surface data, and Table 28 represents lens group data.

The zooming optical system Z according to numerical example 7 has the same lens configuration as that of the zooming optical system Z according to numerical example 1 except for the following points:

1) The positive lens 24 of the second lens group G2 is a biconvex positive lens;

2) The positive lens 32 of the third lens group G3 is a biconvex positive lens; and 3) The positive lens 44 of the fourth lens group G4 is a biconvex positive lens.

TABLE 25

Surface Data

| Surface Number | R | d | N(d) | ν(d) |
|---|---|---|---|---|
| 1* | 142.085 | 2.800 | 1.69350 | 53.2 |
| 2 | 26.216 | 6.167 | | |
| 3 | 86.760 | 1.700 | 1.72916 | 54.7 |
| 4 | 18.186 | 0.200 | 1.52972 | 42.7 |
| 5* | 19.805 | 8.746 | | |
| 6 | −40.482 | 1.952 | 1.81000 | 35.4 |
| 7 | 188.291 | 1.500 | | |
| 8 | 57.177 | 8.426 | 1.54154 | 47.0 |
| 9 | −15.395 | 1.500 | 1.82000 | 46.6 |
| 10 | −35.964 | d10 | | |
| 11 | 68.530 | 7.242 | 1.56730 | 42.8 |
| 12 | −17.874 | 1.300 | 1.82000 | 46.3 |
| 13 | −65.091 | 0.200 | | |
| 14 | 119.348 | 2.106 | 1.58733 | 41.4 |
| 15 | −198.635 | 2.511 | | |
| 16 | 297.620 | 2.735 | 1.49700 | 81.6 |
| 17 | −43.210 | d17 | | |
| 18 Stop | ∞ | 2.508 | | |
| 19 | −41.613 | 1.300 | 1.80400 | 46.6 |
| 20 | 24.884 | 3.800 | 1.84666 | 23.8 |
| 21 | −726.885 | d21 | | |
| 22 | 22.286 | 5.547 | 1.43875 | 95.0 |
| 23 | −38.164 | 0.124 | | |
| 24 | −97.229 | 1.300 | 1.84666 | 23.8 |
| 25 | 31.047 | 5.493 | 1.49700 | 81.6 |
| 26 | −31.242 | 0.150 | | |
| 27* | 37034.214 | 1.449 | 1.51633 | 64.1 |
| 28* | −135.641 | — | | |

*Rotationally Symmetric Aspherical Surface

TABLE 26

Various Data
Zooming Ratio 1.57

| | Short | Intermediate | Long |
|---|---|---|---|
| FNO. | 2.9 | 2.9 | 2.9 |
| f | 11.25 | 14.00 | 17.70 |
| W | 52.7 | 45.3 | 38.2 |
| Y | 14.24 | 14.24 | 14.24 |
| fB | 37.72 | 41.09 | 46.64 |
| L | 134.42 | 134.28 | 136.89 |
| d10 | 13.885 | 8.026 | 2.822 |
| d17 | 1.666 | 8.374 | 15.192 |
| d21 | 10.394 | 6.033 | 1.483 |

Short: Short Focal Length End,
Intermediate: Intermediate Focal length, and
Long: Long Focal Length End

TABLE 27

AsphericalSurface Data

| Surface Number | K | A4 | A6 | A8 | A10 | A12 |
|---|---|---|---|---|---|---|
| 1 | 0.000 | 0.3874E−04 | −0.1158E−06 | 0.3322E−09 | −0.5358E−12 | 0.3883E−15 |
| 5 | −0.356 | 0.7396E−04 | −0.4141E−06 | 0.2135E−08 | −0.6792E−11 | 0.0000E+00 |
| 27 | 0.000 | −0.7407E−04 | −0.3939E−06 | 0.2197E−08 | 0.8970E−11 | −0.2774E−13 |
| 28 | 0.000 | −0.4488E−04 | −0.3440E−06 | 0.3148E−08 | 0.0000E+00 | 0.0000E+00 |

TABLE 28

Lens Group Data

| Group | Starting Surface | Focal Length |
|---|---|---|
| 1 | 1 | −15.61 |
| 2 | 11 | 38.34 |
| 3 | 19 | −61.13 |
| 4 | 22 | 34.52 |

Table 29 represents the values for the conditional expressions according to each numerical example.

TABLE 29

|  | Example 1 | Example 2 | Example 3 | Example 4 |
|---|---|---|---|---|
| Conditional Expression (1) | −2.60 | −2.41 | −2.10 | −2.42 |
| Conditional Expression (2) | 4.02 | 3.53 | 2.09 | 2.73 |
| Conditional Expression (3) | −0.59 | −0.59 | −0.91 | −0.91 |
| Conditional Expression (4) | −0.143 | −0.195 | −0.383 | −0.251 |
| Conditional Expression (5) | −0.388 | −0.483 | −0.586 | −0.488 |

|  | Example 5 | Example 6 | Example 7 |
|---|---|---|---|
| Conditional Expression (1) | −2.28 | −2.23 | −2.46 |
| Conditional Expression (2) | 2.28 | 2.44 | 3.92 |
| Conditional Expression (3) | −0.87 | −0.84 | −0.56 |
| Conditional Expression (4) | −0.455 | −0.356 | −0.217 |
| Conditional Expression (5) | −0.553 | −0.530 | −0.486 |

As is apparent from Table 29, the numerical examples 1 through 7 satisfy the conditional expressions (1) through (5). As is apparent from the aberration diagrams, various aberrations are successfully corrected.

Even if a lens or lens group having no substantial power is added to the zooming optical system included in the scope of the claims of the present disclosure, it is still within the technical scope of the present disclosure (does not go beyond the technical scope of the present disclosure).

The zooming optical system Z according to at least one embodiment of the present disclosure includes a first lens group having negative refractive power; a second lens group having positive refractive power; a third lens group having negative refractive power; and a fourth lens group having positive refractive power in that order from an object side. The first lens group has at least one cemented lens having positive refractive power. Each of the first lens group, the second lens group, the third lens group, and the fourth lens group moves along a direction of an optical axis in zooming. Conditional expression (1) below is satisfied:

$$-10.0 < f2/f1 < -2.0 \tag{1},$$

where
f1 is the focal length of the first lens group G1, and
f2 is a focal length of the second lens group G2.

The zooming optical system Z according to at least one embodiment of the present disclosure preferably satisfies conditional expression (1aa) within the range defied by conditional expression (1):

$$-3.0 < f2/f1 < -2.0 \tag{1aa}.$$

The zooming optical system Z according to at least one embodiment of the present disclosure preferably satisfies conditional expression (2) below:

$$2.0 < f3/f1 < 5.0 \tag{2},$$

where
f1 is the focal length of the first lens group G1, and
f3 is the focal length of the third lens group G3.

The zooming optical system Z according to at least one embodiment of the present disclosure preferably satisfies conditional expression (3) below:

$$-1.0 < f4/f3 < 0 \tag{3},$$

where
f3 is the focal length of the third lens group G3, and
f4 is the focal length of the fourth lens group G4.

Alternatively, in some embodiments, the first lens group G1 has a negative lens nearest to the object side.

The zooming optical system Z according to another embodiment of the present disclosure, in order from the object side, a first lens group G1 having negative refractive power, a second lens group G2 having positive refractive power, a third lens group G3 having negative refractive power, and a fourth lens group G4 having positive refractive power. In the zooming optical system, each lens group moves in the direction of the optical axis during zooming. The first lens group G1 has a negative lens nearest to the object side. The fourth lens group G4 includes at least four lenses and at least one cemented lens, and satisfies conditional expressions (1a) and (2a), and (3a) below:

$$-2.5 < f2/f1 < -2.0 \tag{1a};$$

$$2.0 < f3/f1 < 4.0 \tag{2a}; \text{ and}$$

$$-1.0 < f4/f3 < -0.5 \tag{3a},$$

where
f1 is the focal length of the first lens group G1,
f2 is the focal length of the second lens group G2,
f3 is the focal length of the third lens group G3, and
f4 is the focal length of the fourth lens group (G4).

The first lens group G1 has at least one set of cemented lenses with positive refractive power, and preferably satisfies conditional expression (4) below:

$$RcP/fcP < 0 \tag{4},$$

where
RcP is the radius of curvature of a bonded surface of at least one cemented lens having positive refractive power in the first lens group G1, and
fcP is the focal length of at least one cemented lens having positive refractive power in the first lens group G1.

The zooming optical system Z according to at least one embodiment of the present disclosure preferably satisfies conditional expression (4a) below within the range defied by conditional expression (4):

$$-0.5 < RcP/fcP < 0 \tag{4a}.$$

The first lens group G1 has at least one cemented lens having positive refractive power, and at least one cemented lens having negative refractive power. The first lens group G1 preferably satisfies conditional expression (5) below:

$$-0.6 < fcN/fcP \tag{5},$$

where
fcP is the focal length of at least one cemented lens having positive refractive power in the first lens group G1; and fcN is the focal length of at least one cemented lens having negative refractive power in the first lens group G1.

The zooming optical system Z according to at least one embodiment of the present disclosure preferably satisfies conditional expression (5a) below within the range defied by conditional expression (5):

$$-0.6 < fcN/fcP < -0.2 \qquad (5a).$$

In some embodiments, the third lens group G3 consists of a cemented lens.

With the above-described configurations, the zooming optical system according to the embodiments of the present disclosure provides higher optical performance in imaging angles of less than 100 degrees as well as greater than or equal to 100 degrees at the short focal length end.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A zooming optical system, comprising:
   a first lens group having negative refractive power, the first lens group having at least one cemented lens having positive refractive power;
   a second lens group having positive refractive power;
   a third lens group having negative refractive power; and
   a fourth lens group having positive refractive power, in that order from an object side,
   each of the first lens group, the second lens group, the third lens group, and the fourth lens group configured to move along a direction of an optical axis in zooming, and
   wherein conditional expression (1) below is satisfied:

$$-10.0 < f2/f1 < -2.0 \qquad (1),$$

where f1 is a focal length of the first lens group, and f2 is a focal length of the second lens group,
   wherein the first lens group further includes at least one cemented lens having negative refractive power, and
   wherein conditional expression (5) is further satisfied:

$$-0.6 < fcN/fcP \qquad (5),$$

where fcP is a focal length of the at least one cemented lens having positive refractive power in the first lens group, and fcN is a focal length of the at least one cemented lens having negative refractive power in the first lens group.

2. The zooming optical system according to claim 1, wherein conditional expression (2) is further satisfied:

$$2.0 < f3/f1 < 5.0 \qquad (2),$$

where f1 is the focal length of the first lens group, and f3 is a focal length of the third lens group.

3. The zooming optical system according to claim 1, wherein conditional expression (3) is further satisfied:

$$-1.0 < f4/f3 < 0 \qquad (3),$$

where f3 is a focal length of the third lens group, and f4 is a focal length of the fourth lens group.

4. The zooming optical system according to claim 1, wherein the first lens group has a negative lens disposed closest to the object side.

5. The zooming optical system according to claim 1, wherein conditional expression (4) is further satisfied:

$$RcP/fcP < 0 \qquad (4),$$

where RcP is a radius of curvature of a bonded surface of the at least one cemented lens having positive refractive power in the first lens group, and fcP is a focal length of the at least one cemented lens having positive refractive power in the first lens group.

6. The zooming optical system according to claim 1, wherein the third lens group includes only a cemented lens.

7. A zooming optical system comprising:
   a first lens group having negative refractive power, the first lens group having a negative lens disposed closest to an object side;
   a second lens group having positive refractive power;
   a third lens group having negative refractive power; and
   a fourth lens group having positive refractive power, in that order from the object side, the fourth lens group including at least four lenses that includes at least one cemented lens,
   each of the first lens group, the second lens group, the third lens group, and the fourth lens group configured to move along a direction of an optical axis in zooming, and
   wherein conditional expressions (1a), (2a), and (3a) are satisfied:

$$-2.5 < f2/f1 < -2.0 \qquad (1a),$$

$$2.0 < f3/f1 < 4.0 \qquad (2a), \text{ and}$$

$$-1.0 < f4/f3 < -0.5 \qquad (3a)$$

where f1 is a focal length of the first lens group,
   f2 is a focal length of the second lens group,
   f3 is a focal length of the third lens group, and
   f4 is a focal length of the fourth lens group.

8. The zooming optical system according to claim 7, wherein the first lens group includes at least one cemented lens having positive refractive power, and wherein conditional expression (4) is satisfied:

$$RcP/fcP < 0 \qquad (4),$$

where RcP is a radius of curvature of a bonded surface of the at least one cemented lens having positive refractive power in the first lens group, and fcP is a focal length of the at least one cemented lens having positive refractive power in the first lens group.

9. The zooming optical system according to claim 7, wherein the first lens group includes at least one cemented lens having positive refractive power and at least one cemented lens having negative refractive power, and wherein conditional expression (5) is satisfied:

$$-0.6 < fcN/fcP \qquad (5),$$

where fcP is a focal length of the at least one cemented lens having positive refractive power in the first lens group, and fcN is a focal length of the at least one cemented lens having negative refractive power in the first lens group.

10. The zooming optical system according to claim 7, wherein the third lens group includes only a cemented lens.

* * * * *